US009847562B2

(12) United States Patent
Kondo

(10) Patent No.: US 9,847,562 B2
(45) Date of Patent: Dec. 19, 2017

(54) BATTERY PACK

(71) Applicant: MAKITA CORPORATION, Anjo-shi (JP)

(72) Inventor: Eiji Kondo, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 86 days.

(21) Appl. No.: 15/015,263

(22) Filed: Feb. 4, 2016

(65) Prior Publication Data

US 2016/0240901 A1 Aug. 18, 2016

(30) Foreign Application Priority Data

Feb. 13, 2015 (JP) ................................ 2015-026526

(51) Int. Cl.
*H01M 10/6566* (2014.01)
*H01M 10/613* (2014.01)
(Continued)

(52) U.S. Cl.
CPC ..... *H01M 10/6566* (2015.04); *H01M 2/1055* (2013.01); *H01M 10/613* (2015.04);
(Continued)

(58) Field of Classification Search
CPC ........... H01M 10/6566; H01M 10/613; H01M 10/6235; H01M 10/643; H01M 10/6563; H01M 2/1055; H01M 2220/30
See application file for complete search history.

(56) References Cited

U.S. PATENT DOCUMENTS 6,967,464 B2 * 11/2005 Heigl .................. H02J 7/00
320/107
7,141,331 B2 * 11/2006 Ziegler ................ H01M 2/105
429/100

(Continued)

FOREIGN PATENT DOCUMENTS

JP 2002025516 A * 1/2002
JP 2003142051 A 5/2003
JP 2011222171 A 11/2011

OTHER PUBLICATIONS

Extended European Search Report from the European Patent Office dated Jul. 25, 2016 in related EP application No. 16 155 054.6, including Search Opinion, Search Report and examined claims 1-14.

*Primary Examiner* — Gregg Cantelmo
(74) *Attorney, Agent, or Firm* — J-TEK Law PLLC; Jeffrey D. Tekanic; Scott T. Wakeman

(57) ABSTRACT

As a cooling draft flows from a rear side to a front side of battery cells (72) inside a battery pack (30), it is divided into two cooling drafts (F1, F2) in a left-right direction, which is the direction that the battery cells (72) are disposed in parallel, and those two cooling drafts respectively flow through a plurality of passageways that longitudinally extend along the battery cells (72). More particularly, a second battery cell (722) is cooled by the cooling draft flowing in a second ventilation-path volume (Q2) before a first battery cell (721) and a third battery cell (723) are cooled by cooling drafts respectively flowing in a first ventilation-path volume (Q1) and a third ventilation-path volume (Q3), which are longer than the second ventilation-path volume (Q2).

23 Claims, 17 Drawing Sheets

(51) Int. Cl.
*H01M 10/6235* (2014.01)
*H01M 10/643* (2014.01)
*H01M 10/6563* (2014.01)
*H01M 2/10* (2006.01)

(52) U.S. Cl.
CPC ..... *H01M 10/6235* (2015.04); *H01M 10/643* (2015.04); *H01M 10/6563* (2015.04); *H01M 2220/30* (2013.01)

(56) References Cited

U.S. PATENT DOCUMENTS

| | | | |
|---|---|---|---|
| 2003/0082439 A1* | 5/2003 | Sakakibara | H01M 2/0202 429/120 |
| 2004/0081885 A1 | 4/2004 | Ziegler et al. | |
| 2009/0229957 A1 | 9/2009 | Nishimiya et al. | |
| 2013/0230757 A1 | 9/2013 | Sakakibara | |

* cited by examiner

BATTERY PACK

CROSS-REFERENCE

This application claims priority to Japanese patent application serial number 2015-026526, filed on Feb. 13, 2015, the content of which are incorporated herein by reference in its entirety.

TECHNICAL FIELD

The present invention generally relates to a battery pack that serves as a power supply of a power tool and is mountable on a tool main body of the power tool.

BACKGROUND ART

Known power tools have been configured such that a battery pack, which constitutes a drive-power supply of a tool main body, is detachable. The battery pack comprises a case (housing), which constitutes an outer shell, and a battery main body, which is installed in an interior of the case. The battery main body comprises a plurality of rechargeable battery cells. The battery cells that constitute such a battery main body are lined up and disposed so as to minimize the required space in the interior of the case. Specifically, the battery cells are disposed in parallel and the longitudinal ends (plus and minus electrodes) of the battery cells are aligned and arranged (oriented) in an alternating manner. With such a parallel arrangement, the battery pack is arranged transversely such that the longitudinal direction of the battery cells is oriented in a direction orthogonal to the direction in which the battery pack is slid when mounted on a power tool (see e.g., Japanese Laid-open Patent Publication 2003-142051 and its US counterpart US 2013/0230757).

When the remaining charge of the battery pack becomes low, the battery pack is removed from the tool main body and is charged by a dedicated charger. Due to the internal resistance of the battery cells and the charging current, the battery cells generate heat while being charged. Consequently, in the above-noted known battery pack system, the dedicated charger is provided with a ventilation mechanism that forces a cooling draft (cooling air) over the battery cells to cool them during the charging. That is, when the dedicated charger is charging the battery pack, the ventilation mechanism delivers a cooling draft (forced cooling air) into the interior of the case. This cooling draft flows through the interior of the case in a direction parallel to (along) the mounting direction of the battery pack. As a result, because the cooling draft blows transversely against each of the battery cells that are disposed in parallel, the cooling draft can cool every one of the battery cells with little unevenness.

SUMMARY OF THE INVENTION

As an alternative to the above-described transverse arrangement of the battery cells within the case, it is also possible to longitudinally dispose the battery cells in parallel by rotating the battery cells by an angle of 90° with respect to the case. In such a longitudinal arrangement, the longitudinal direction (axial centerline) of the battery cells coincides with (is parallel to) the direction in which the battery pack is slid when it is mounted on the power tool or charger. However, in such a longitudinal arrangement, the cooling draft supplied by the ventilation mechanism may be unevenly guided to (contact) the battery cells disposed in parallel. That is, only the battery cells that guide the flow of the cooling draft tend to be cooled, whereas battery cells that do not guide the flow of the cooling draft tend not to be cooled. Thus, uneven cooling of the battery cells could result in an adverse manner. Such cooling unevenness means that the battery cells may not be charged as quickly as may be permitted by the battery chemistry (i.e. if the cooling effectiveness/evenness were better), because one or more of the battery cells may reach damagingly high temperatures during the charging due to the high current applied to the battery cells and the insufficient cooling of such battery cell(s). Therefore, to avoid damaging one or more of the (insufficiently cooled) battery cells, the charging current must be less (lower) than an embodiment in which the evenness of the cooling were to be improved, thereby lengthening the time until all the battery cells reach a fully charged state (i.e. charging time is increased).

In view of these circumstances, one non-limiting object of the present teachings is to provide a battery pack that is mountable on a tool main body of a power tool and that is designed to improve the evenness of the cooling of all of the battery cells during a charging operation. For example, in some embodiments of the present teachings, the battery pack may be designed such that cooling air (one or more cooling drafts) blows against (contacts) all of the battery cells, even if the battery cells are disposed in parallel in a longitudinal arrangement in the interior of the case. Such a design has the advantageous effect of reducing cooling unevenness among the battery cells, which permits higher (larger) charging currents to be applied to the battery cells during the charging operation. Consequently, the charging time can be safely decreased because there is a reduced risk of damage to the battery cells caused by excessive temperatures.

In a first aspect of the present teachings, a battery pack is disclosed that is mountable on a power tool and a charger, and that comprises: a case constituting an outer shell and a plurality of columnar battery cells disposed in an interior of the case such that the battery cells are aligned (e.g., longitudinal ends or electrodes thereof are aligned) and are disposed in parallel in the longitudinal direction. A first ventilation hole and (two or more) second ventilation holes are formed such that they permit fluid (air) communication between the interior and the exterior (surrounding environment) of the case. A ventilation path is provided (defined) in the interior of the case and makes possible ventilation of the battery cells, wherein the first ventilation hole serves as an inlet thereof and the second ventilation holes serve as outlets thereof. A plurality of longitudinal-direction passageways, wherethrough cooling drafts respectively flow along the longitudinal direction of the battery cells, is provided (defined) in the ventilation path in the direction that the battery cells are disposed in parallel (i.e. along the longitudinal extension of the battery cells).

In such an embodiment of the present teachings, because the longitudinal-direction passageways, wherethrough cooling drafts respectively flow along the longitudinal direction of the battery cells, are provided in the direction that the battery cells are disposed in parallel, cooling drafts tend to blow against the longitudinal extension of all of the battery cells disposed in parallel in the interior of the case. As a result, it is possible to reduce cooling unevenness that could otherwise occur among the battery cells. That is, it is possible to make the cooling among the battery cells more even (uniform), which can lead to improvements in charging efficiency, because the battery cells may be charged using higher (larger) charging currents (resulting in a reduced charging time) without the risk of reaching damagingly high temperatures.

In a second aspect of the present teachings, the longitudinal-direction passageways are defined between the battery cells and portions of the case, which face the battery cells, based on the outer circumferential shape of the battery cells and the inward-directed surface(s) of the case, which face(s) (oppose) the battery cells. In such an embodiment, the longitudinal-direction passageways can be defined such that they touch (contact or flow along) the outer-circumferential surfaces of the battery cells, which makes it possible to increase the cooling efficiency of the battery cells.

In a third aspect of the present teachings, a branch part is provided (defined) in the interior of the case. The branch part branches (divides) the cooling draft (forced cooling air exhausted from a charger) that enters via the first ventilation hole and causes two or more cooling drafts to respectively flow to the plurality of the longitudinal-direction passageways. In such an embodiment, because the draft that enters via the first ventilation hole can be branched and caused to flow into each longitudinal-direction passageway, unevenness in the cooling can be reduced.

In a fourth aspect of the present teachings, at least a portion of the branch part also serves to hold at least one of the battery cells, which has the effect of reducing or eliminating rattling of the battery cells while increasing the cooling efficiency of all of the battery cells. As a result, it is possible to achieve compact battery pack designs while increasing the quality of the product.

In a fifth aspect of the present teachings, the branch part is disposed (defined) on an upstream side (with respect to the longitudinal center of the battery cells) of the draft that flows in the longitudinal direction. As the branched drafts flow from the upstream side to the downstream side, the drafts tend to gradually warm up due to the elevated temperature of the battery cells themselves. However, in such an embodiment, it is possible to blow more of (a greater portion of) the draft(s) onto the battery cells cooled on the downstream side than to the battery cell(s) cooled on the upstream side. That is, the cooling air (cooling draft(s)) has a greater contact time or greater contact surface area with regard to a downstream portion of two or more of the battery cells than an upstream side thereof. This means that, downstream cooling air (which is warmer than upstream cooling air) can better cool the downstream portions of the battery cells. As a result, unevenness in the cooling of the plurality of the battery cells can be reduced, i.e. cooling differences among the battery cells can be reduced.

In a sixth aspect of the present teachings, the branch part is defined (disposed) on an inner bottom surface of the case. In such an embodiment, the branch part can be provided without increasing the part count, which makes it possible to efficiently and cost-effectively achieve compact designs of the battery pack.

In a seventh aspect of the present teachings, a cell holder, which holds the battery cells, is disposed in the interior of the case. In addition, two or more of the longitudinal-direction passageways are defined between the battery cells and the portion(s) of the cell holder, which face(s) the battery cells, based on the outer circumferential shape of the battery cells and surface(s) of the cell holder, which face(s) (oppose) the battery cells. A holder-branch part, which branches the draft that enters via the first ventilation hole and causes two or more drafts to respectively flow to the two or more longitudinal-direction passageways defined in/by the holder-branch part, is provided in the cell holder.

In such an embodiment, the cell holder holds the battery cells, which means that rattling of the battery cells in the interior of the case can be better prevented. In addition, because the holder-branch part is provided on the cell holder, the cooling efficiency of one or more of the battery cells can also be increased. As a result, it is possible to increase cooling efficiency while increasing the quality of the product.

In an eighth aspect of the present teachings, the battery cells, which are disposed in parallel, are stacked in a plurality of (e.g., two) levels in a direction (e.g., vertically) orthogonal to the direction that the battery cells are disposed in parallel. A separator is interposed between the two levels of battery cells in the stacking direction. At least one communication hole or opening, which permits fluid (cooling air) communication in the stacking direction, is provided in the separator. In such an embodiment, because the separator is interposed between the two (or more) levels of battery cells in the stacking direction, rattling of the battery cells can be prevented. Furthermore, because the communication hole(s) permit(s) fluid (cooling air) communication in the stacking direction, unevenness in the cooling of the battery cells in the stacking direction can be reduced and the cooling of the battery cells can be made efficient.

In a ninth aspect of the present teachings, at least one fixing wall, which makes contact with (supports) the outer-circumferential surfaces of the battery cells, is provided on (projects from) the inner bottom surface of the case. The fixing wall(s) isolate(s) a portion (ventilation volume) of the ventilation path from the electrode-end surfaces of the battery cells. In such an embodiment, even if, for example, moisture, foreign matter, etc. enters into the ventilation path within the interior of the case, the electrode-end surfaces of the battery cells are isolated and thus protected from such moisture, the foreign matter, etc. As a result, it is possible to better prevent the battery cells from short circuiting or corroding.

In a tenth aspect of the present teachings, the first ventilation hole is defined on the upstream side of the drafts that flow into the longitudinal-direction passageways within the case. The second ventilation holes are defined on a downstream side of the (branched) drafts that flow in the longitudinal-direction passageways within the case. In such an embodiment, the longitudinal-direction passageways can be defined without impeding the flow of the draft(s). As a result, the cooling efficiency of the battery cells can be better achieved.

DETAILED DESCRIPTION OF EMBODIMENTS OF THE PRESENT TEACHINGS

First Embodiment

Figure 1:
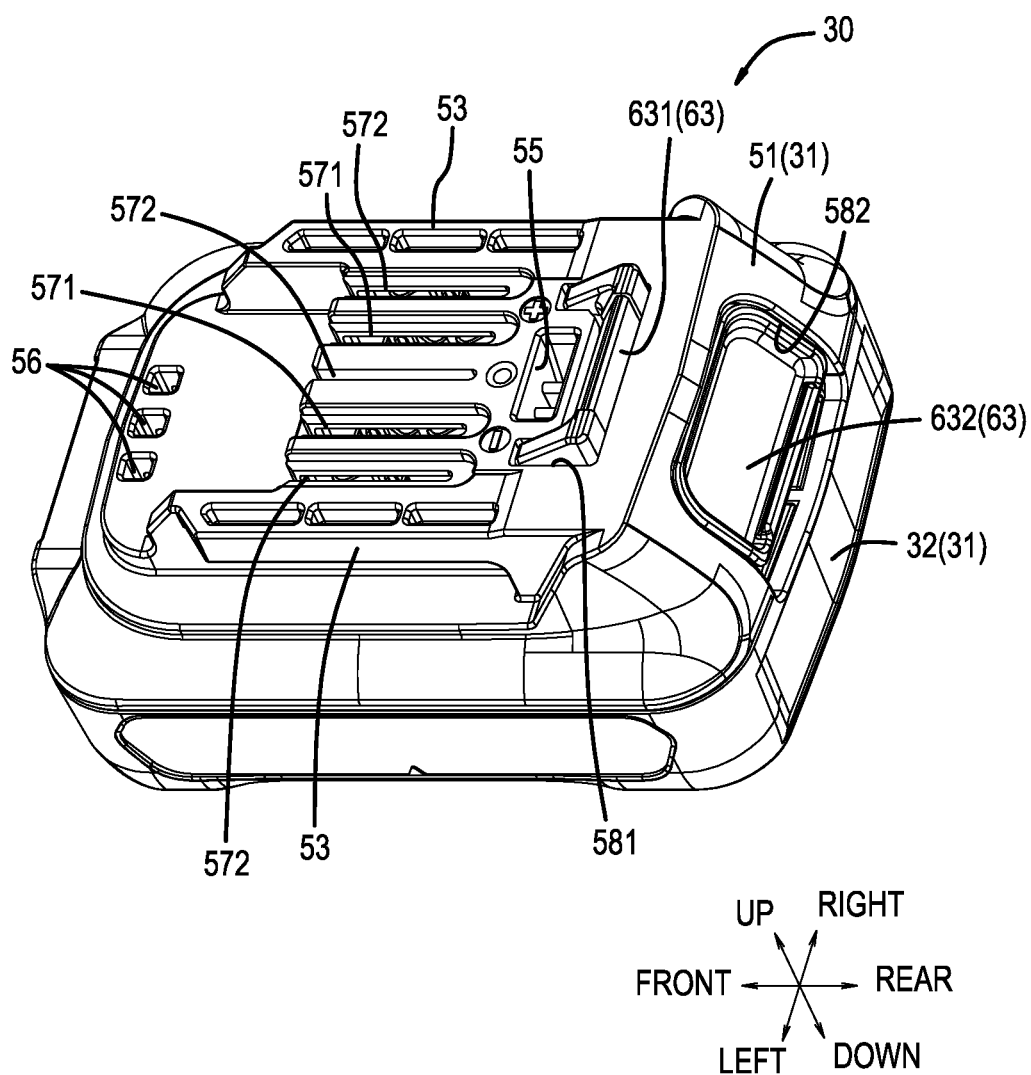
FIG. 1 is an oblique view of a battery pack according to a first embodiment.
Figure 2:
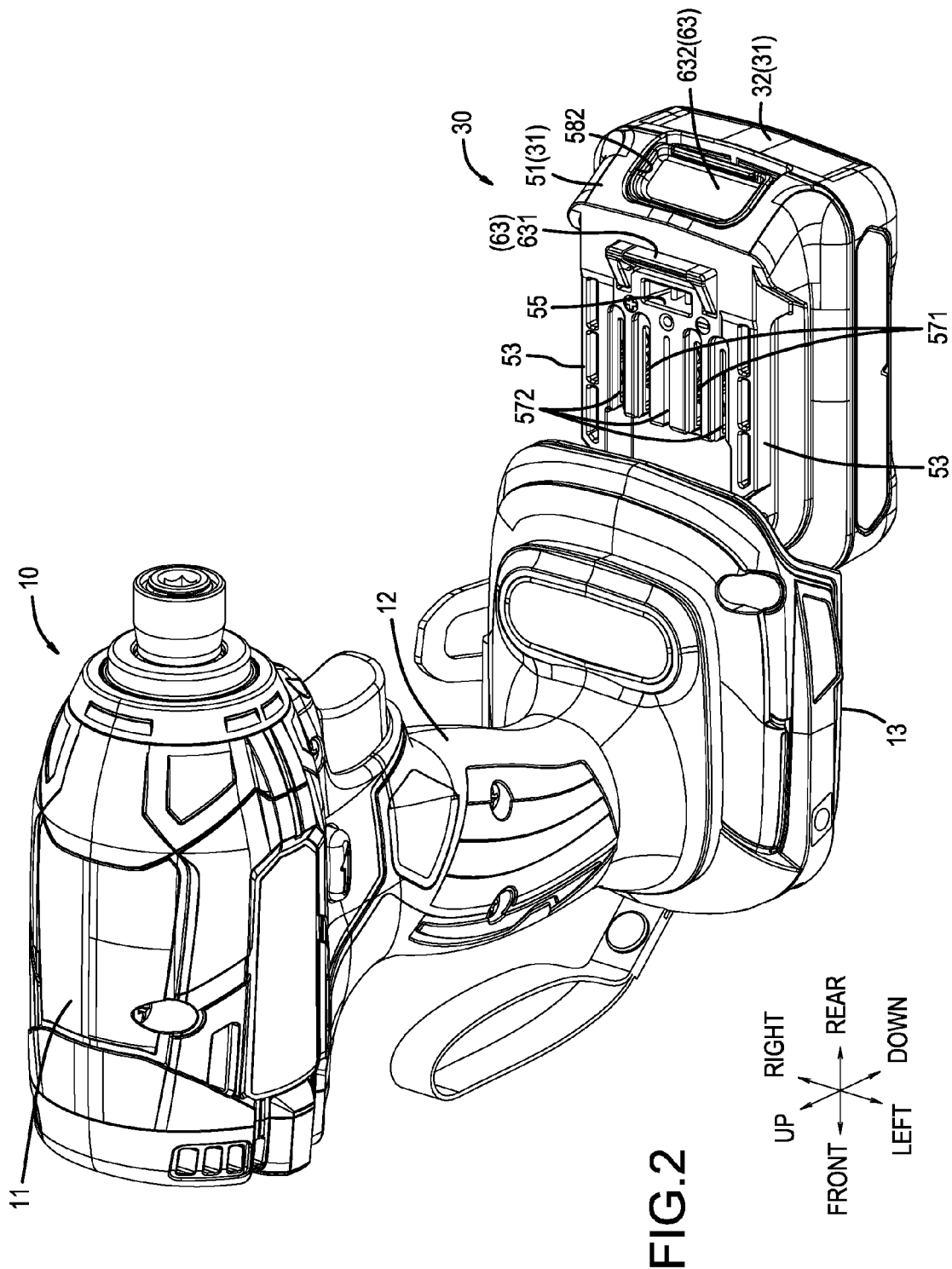
FIG. 2 is an upper-side oblique view that shows the point in time when the battery pack in FIG. 1 is to be mounted on a tool main body.

A first embodiment for implementing a representative, non-limiting battery pack 30 according to the present teachings is explained below with reference to FIG. 1 to FIG. 19. Referring first to FIGS. 1-4, the battery pack 30 is designed to serve as a power supply of a power tool and is capable of being mounted on the tool main body 10. In the present embodiment, the cordless power tool is an impact driver, although the present battery packs may be used with a wide variety of cordless power tools, as will be described below. The battery pack 30 is mounted and dismounted by being slid relative to a battery-mounting part 13 of the tool main body 10.

Generally speaking, the tool main body 10 comprises, in order from above, a drive part 11, a grip part 12, and the battery-mounting part 13. The battery-mounting part 13 is provided with female rails 14 for sliding engagement with the battery pack 30. A positive terminal 15, a negative terminal 16, and a communication terminal 17 are provided between the female rails 14. By sliding the battery pack 30, from the rear side to the front side, relative to the battery-mounting part 13, the positive terminal 15, the negative terminal 16, and the communication terminal 17 are electrically connected to corresponding terminals of the battery pack 30, which is explained below in more detail. The positive terminal 15, the negative terminal 16, and the communication terminal 17 are configured as male terminals and are designed to be electrically connected to female terminals 84, which constitute female terminals of the battery pack 30 as will be explained below.

Figure 4:
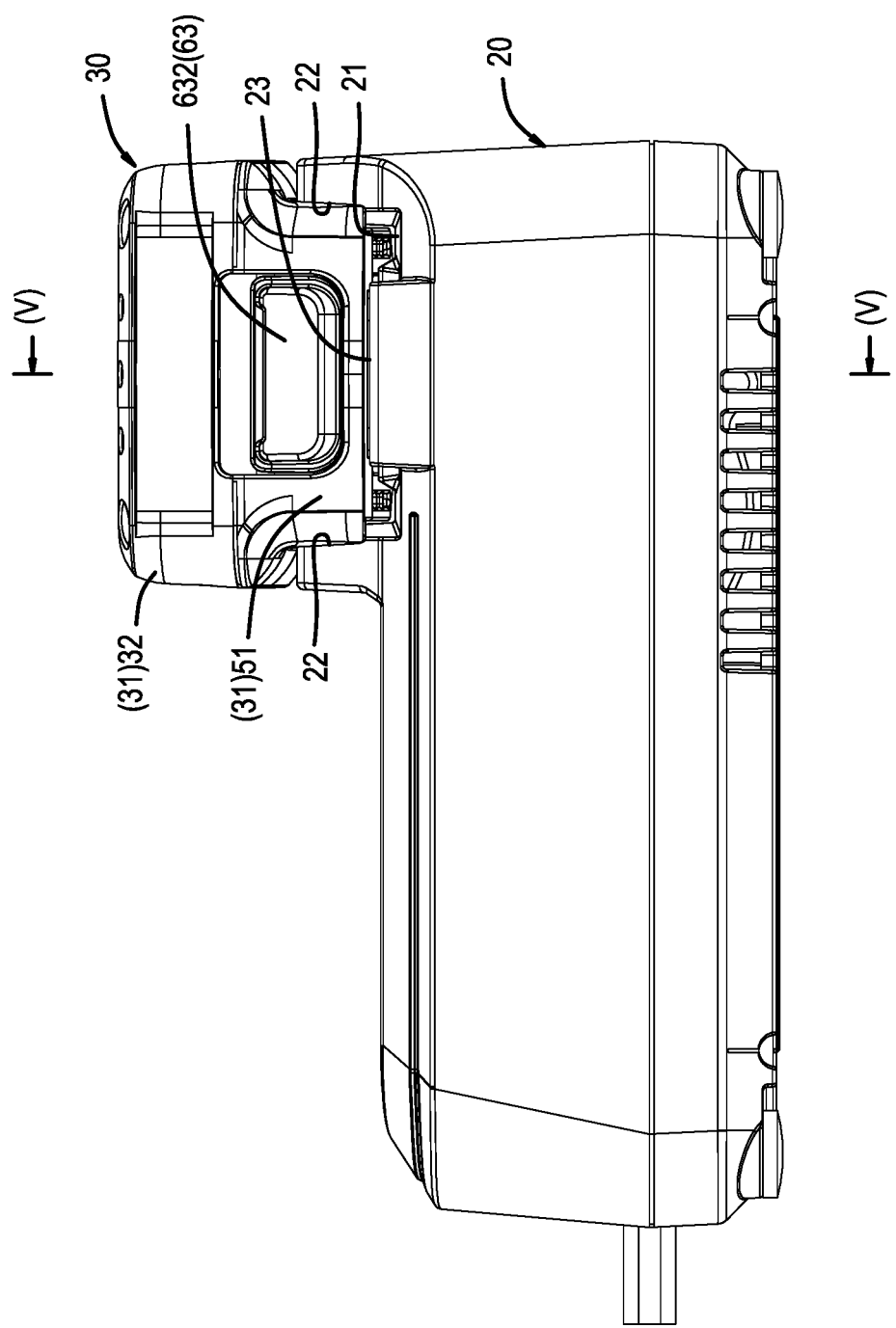
FIG. 4 is a side view that shows the point in time when the battery pack in FIG. 1 has been mounted on a dedicated charger.
Figure 5:
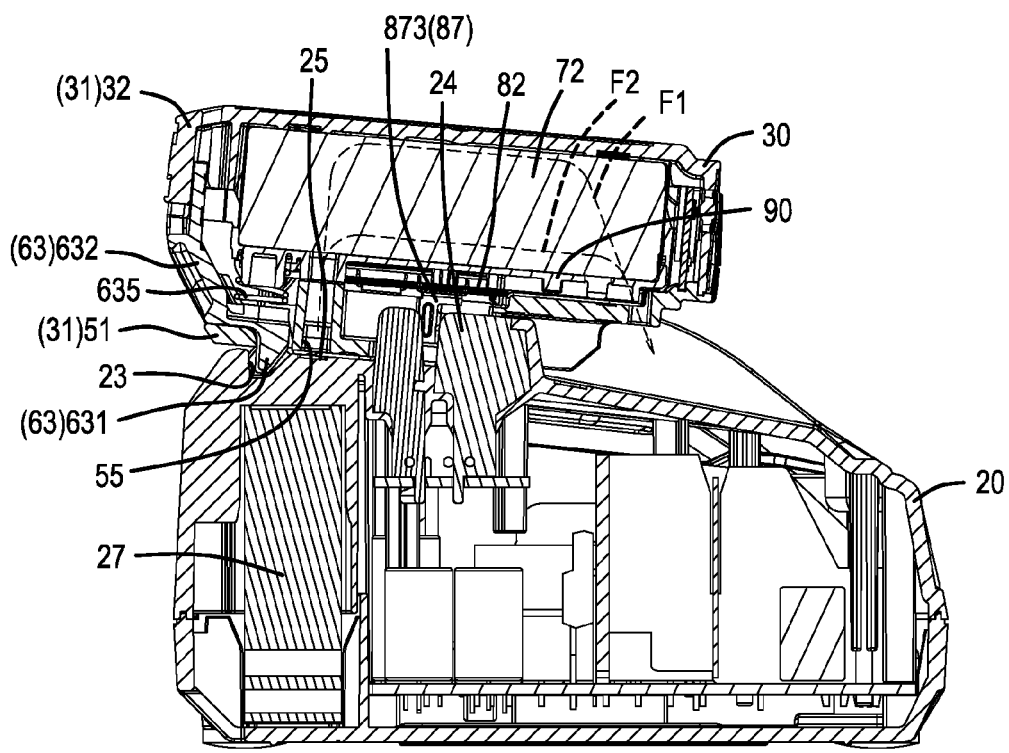
FIG. 5 is a cross-sectional view (auxiliary cross-section) that shows a cross-section taken along line (V)-(V) in FIG. 4.
Figure 6:
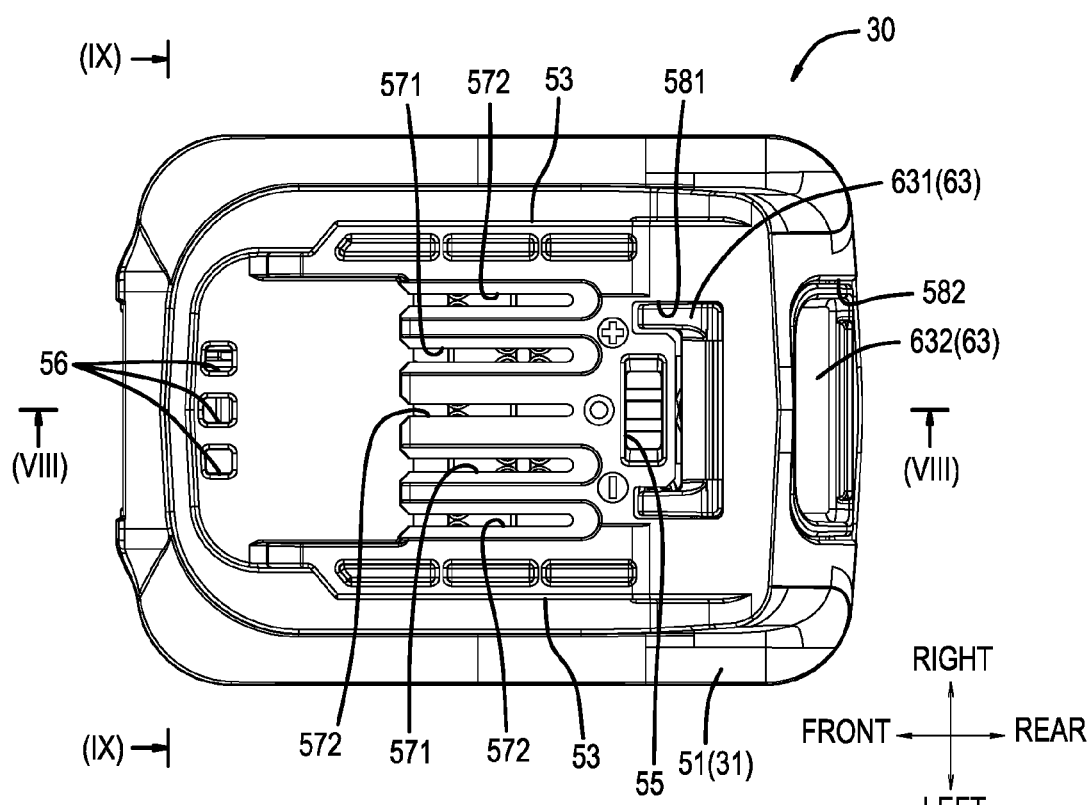
FIG. 6 is a top view of the battery pack shown in FIG. 1.

Reference number 20 shown in FIG. 4 and FIG. 5 denotes a dedicated charger for charging the battery pack 30 shown in FIG. 1. When the remaining charge of the battery pack 30 becomes low, the battery pack 30 is removed from the tool main body 10 and is mounted on the dedicated charger 20 to be charged thereby. In addition, after the battery pack 30 has been fully charged by the dedicated charger 20, it is removed from the dedicated charger 20 and can once again be mounted, as the power supply, on the battery-mounting part 13 of the tool main body 10. A battery-mounting part 21, to which the battery pack 30 is attached and from which it is detached, is provided on an upper surface of the dedicated charger 20. The battery-mounting part 21 is configured substantially the same as the above-described battery-mounting part 13 of the tool main body 10.

Specifically, the battery-mounting part 21 of the dedicated charger 20 is provided with female rails 22, a female hook 23, a charging positive terminal and a charging negative terminal (not shown), and communication terminals 24. When the battery pack 30 is slid and thereby mounted on the battery-mounting part 21, a male hook 631 of the battery pack 30 transitions to a state wherein the male hook 631 mates with the female hook 23 of the battery-mounting part 21 and is thereby latched. While receiving control signals from the communication terminals 24, the battery pack 30 mounted on the battery-mounting part 21 is charged via the charging positive terminal and the charging negative terminal. During the charging, battery cells 72 of the battery pack 30 generate heat due to the internal resistance of the battery cells 72 and the charging current, and consequently a ventilation mechanism 27 for cooling the battery cells 72 during charging is built into the dedicated charger 20.

The ventilation mechanism 27 comprises a ventilation fan (not shown). The ventilation mechanism 27 generates and supplies a cooling draft (forced cooling air) into the interior of the battery pack 30, which is mounted on and charged via the battery-mounting part 21. Consequently, a ventilation port 25 is provided in the battery-mounting part 21. The ventilation port 25 is an air outlet for supplying the cooling draft into the interior of the case 31 of the battery pack 30 mounted on and charged via the battery-mounting part 21. That is, the ventilation port 25 is configured such that it is disposed facing an air-inlet port 55 of the battery pack 30 when the battery pack 30 is mounted on the battery-mounting part 21. The cooling draft generated by the ventilation mechanism is blown out from (through) the ventilation port 25 and enters into the interior of the case 31 of the battery pack 30 through the air-inlet port 55 of the battery pack 30.

Next, the battery pack 30 will be explained with reference to FIG. 6 to FIG. 19. In the following description, the battery pack 30 will be explained based on the directions indicated in the drawings. It is noted that the front side of the battery pack 30 defined in the drawings coincides with the direction in which the battery pack 30 is slid when it is mounted on the power tool or charger. In addition, the upper side of the battery pack 30 defined in the drawings coincides with the direction in which the battery pack 30 faces the battery-mounting parts 13, 21. Furthermore, as illustrated in e.g., FIGS. 6-10, the direction in which the battery cells 72 are disposed in parallel is illustrated as the left-right direction, and the length (elongation) direction of the battery cells 72 is the front-rear direction. That is, with regard to the battery cells 72 according to the first embodiment, the three battery cells 72 are disposed in parallel in the left-right direction in a longitudinal arrangement in the interior of the case 31 (i.e. the long side of the battery cells 72 is parallel to the long side of the case 31, rather than being transverse thereto as in the above-described known art). The outer shape of the battery cells 72 is a circular-cylindrical (columnar) shape, and the battery cells 72 are disposed in the interior of the case 31 such that the longitudinal ends (electrodes) of the battery cells 72 are aligned and the battery cells 72 are arranged in parallel.

Figure 9:
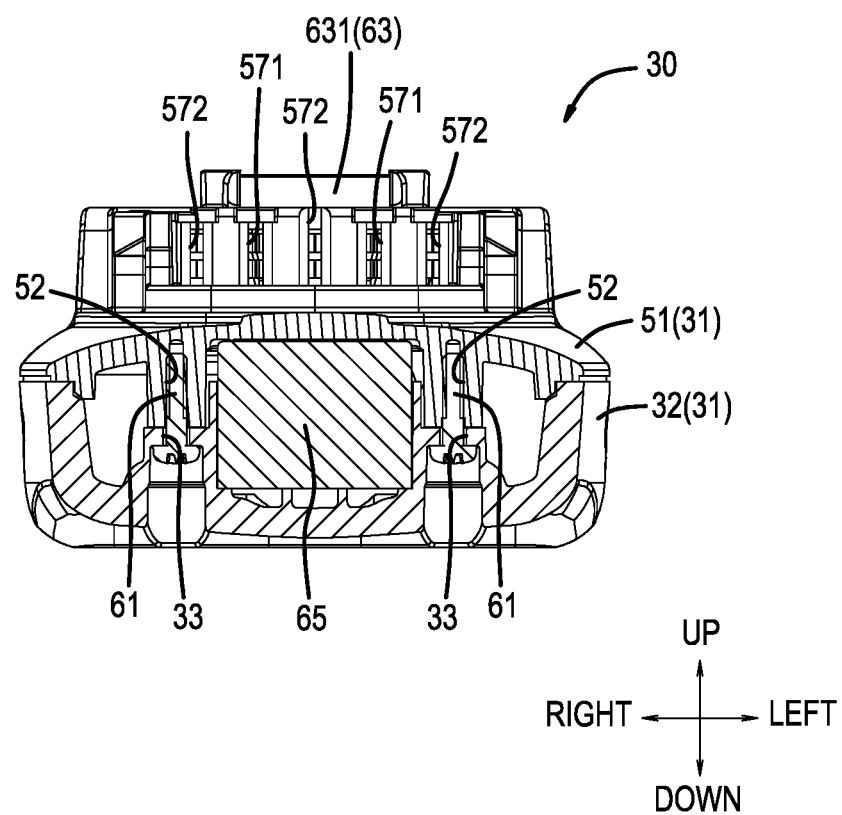
FIG. 9 is a cross-sectional view (auxiliary cross-section) that shows a cross-section taken along line (IX)-(IX) in FIG. 6.
Figure 10:
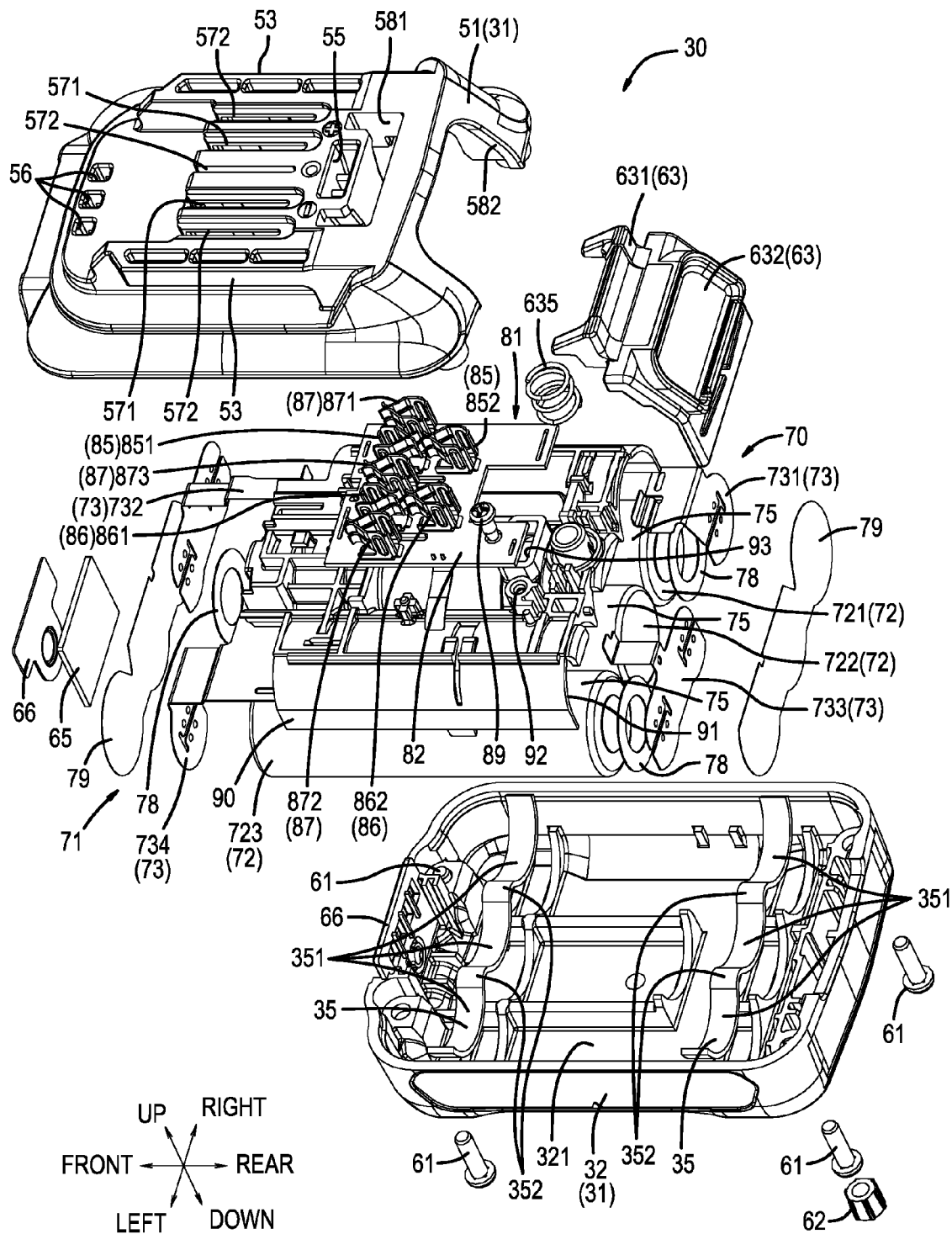
FIG. 10 is an exploded oblique view of the battery pack shown in FIG. 1.

As shown in FIG. 6 to FIG. 10, the battery pack 30 generally comprises the case 31 and a battery main body 70 (see e.g., FIG. 10), which is installed in the interior of the case 31. The case 31 constitutes an outer shell of the battery pack 30 and also functions as a casing (housing) wherein the battery main body 70 is installed. The case 31 has a structure that is vertically split-in-two. That is, the case 31 comprises a lower case 32 and an upper case 51, which are joined in the up-down direction by screws 61, which are shown in FIG. 9. The case 31 thus joined forms a box space wherein the battery main body 70 is installed in the interior thereof. That is, the (e.g., three) battery cells 72 are disposed in parallel in the interior of the case 31. Furthermore, reference number 62 shown in FIG. 10 is a screw cap, which prevents the screws 61 from being unscrewed.

As shown in FIG. 10, the lower case 32 is formed into a shape that is substantially a box, wherein its upper side is open. The lower case 32 principally houses a battery part 71, which is associated with a lower-side region (portion) of the battery main body 70. The lower case 32 is formed such that it has dimensions in the front-rear, left-right, and up-down directions that are capable of accommodating (housing) the three battery cells 72 disposed in parallel in the left-right direction. Two front-side screw holes 33, into which two of the screws 61 are respectively inserted, are provided on a front-surface side of the lower case 32. In addition, two rear-side screw holes 34, into which two of the screws 61 are respectively inserted, are provided on a rear-surface side of the lower case 32, such that the lower case 32 is integrally screw-fastened together with the upper case 51. Furthermore, left-right-partitioning ribs 40 and front-rear-partitioning ribs 45, which are discussed in more detail below, are provided (defined) on (integrally project from) an inner bottom surface 321 of the lower case 32.

Front and rear cushioning mats 35 elastically support the three battery cells 72 at the front and rear thereof. The cushioning mats 35 are formed by shaping a resin foam having suitable elasticity so as to conform to the outer-circumferential surfaces of the battery cells 72. The cushioning mats 35 are respectively held in mat-support areas (regions) P1, P2 defined by the left-right-partitioning ribs 40 and the front-rear-partitioning ribs 45, which will be explained below in greater detail. Each cushioning mat 35 comprises three contact-making circumferential-surface parts 351 and two ribs 352. By utilizing the cushioning mats 35 supported in the mat-support areas P1, P2, the contact-making circumferential-surface parts 351 make contact with the outer-circumferential surfaces 75 of the battery cells 72. Therefore, the battery cells 72 are supported from the lower side and are prevented from making contact with the inner bottom surface 321 of the lower case 32.

As was noted above, the upper case 51 is integrally screw-fastened to the upper side of the lower case 32 by the screws 61. Consequently, female-thread parts 52, into which the screws 61 inserted into the screw holes 33, 34 of the lower case 32 are screwed, are provided in the upper case 51. The upper case 51 is formed into a shape that is substantially a box, wherein the lower side is open. The upper case 51 is designed to house a circuit part 81 of the battery main body 70, which will be explained below. The upper case 51 constitutes the outer shell on the mount side when the battery pack 30 is slid onto, and thereby mounted on, the tool main body 10 or the dedicated charger 20. A pair of left and right male rails 53 is provided on the upper case 51. The male rails 53 are configured such that they are capable of slidably mating (engaging) with the above-described female rails 14, 22 of the tool main body 10 or the dedicated charger 20. This slide-mating (slide-engagement) makes it possible to mount the battery pack 30 by sliding the battery pack 30 relative to the above-described battery-mounting parts 13, 21 of the tool main body 10 or the dedicated charger 20. The male rails 53 have a shape that extends frontward and rearward while projecting toward both the left and right sides.

The upper case 51 is provided with two charging/discharging slits 571 and three communication slits 572. The charging/discharging slits 571 and the communication slits 572 are provided in the upper case 51 such that they have a slit shape wherethrough the plate-shaped male terminals (the positive terminal 15, the negative terminal 16, and the communication terminal 17) can be inserted. Consequently, the charging/discharging slits 571 and the communication slits 572 are defined in the upper case 51 such that they extend in the front-rear direction, which is the insertion direction. In addition, a hook opening 581, which is for pushing out the male hook 631 toward the exterior, and a manipulation opening 582, which is for exposing a manipulation part (button) 632 to the exterior, are provided in the upper case 51. In addition, a display opening 59 (see FIG. 8), which is for holding (disposing) an LED label 66, is provided in a front surface of the upper case 51.

In addition, the air-inlet port 55, which supplies the cooling draft from the exterior into the interior of the case 31, is provided in the upper case 51. The air-inlet port 55 is an opening that permits the cooling draft exhausted (blown out) from the above-described ventilation port 25 to enter into the interior of the case 31. In addition, the upper case 51 is provided with (two) exhaust ports 56, which exhaust the cooling draft(s) from the interior to the exterior of the case 31 after the battery cells 72 have been cooled thereby. The exhaust ports 56 are openings that discharge, to the exterior (ambient environment) of the case 31, the cooling draft that had entered into the interior of the case 31 via the air-inlet port 55. That is, the air-inlet port 55 and the exhaust ports 56 are formed such that they permit (provide) fluid (cooling air) communication between the interior and the exterior of the case 31. As will be further described below, a ventilation path, which makes possible ventilation, is provided (defined) in the interior of the case 31; the air-inlet port 55 serves as an inlet thereof and the exhaust ports 56 (second ventilation holes) serve as outlets thereof. The ventilation path includes passageways that extend (pass) through the interior of the case 31 along the flow paths of the cooling drafts F1, F2 shown in FIG. 5. It is noted that the air-inlet port 55 provides one representative, non-limiting example of a first ventilation hole according to the present teachings, and the exhaust ports 56 each correspond to a second ventilation hole according to the present teachings. The cooling draft that enters through the air-inlet port 55 and exits from the exhaust ports 56 principally cools the battery cells 72. Furthermore, the air-inlet port 55 is configured (disposed) such that it is proximate to the rear side of the case 31, which is the upstream side of the case 31 in the direction in which the cooling draft flows, The exhaust ports 56 are configured (disposed) such that they are proximate to the front side of the case 31, which is a downstream side of the case 31 in the direction in which the cooling draft flows.

Next, the battery main body 70, which is installed in the interior of the case 31, will be explained. The battery main body 70 performs various functions as a rechargeable battery. As shown in FIG. 10, the battery main body 70 comprises the battery part 71 and the circuit part 81. The battery part 71 generally comprises a cell holder 90, the three battery cells 72 (721, 722, 723), and lead plates 73 (731, 732, 733, 734). The cell holder 90 functions as a holder that collectively supports the three battery cells 72, and functions as a seat that fixes and supports a terminal board 82 that supports terminals 85, 86, 87. That is, the cell holder 90, on its lower side, collectively supports the three battery cells 72, and, on its upper surface, fixes and supports the terminal board 82. The battery cells 72 are identical and may be widely used rechargeable (e.g., lithium ion) battery cells formed with a columnar outer shape.

In the following description, the battery cells 72 will be further designated/distinguished, in order from right to left, as the first battery cell 721, the second battery cell 722, and the third battery cell 723. The battery cells 72 are collectively supported by the cell holder 90 and are housed in the interior of the lower case 32. The three battery cells 72 are longitudinally disposed in parallel in the left-right direction wherein the columnar shape extends in the front-rear direction. Here, the three battery cells 72 are disposed in parallel such that the plus and minus electrodes of adjacent battery cells 72 alternate and such that the battery cells 72 can be connected in series. Specifically, with regard to the first battery cell 721, the front side is the negative electrode and the rear side is the positive electrode. With regard to the second battery cell 722, the front side is the positive electrode and the rear side is the negative electrode. With regard to the third battery cell 723, the front side is the negative electrode and the rear side is the positive electrode. Optionally, an insulating sheet 78 may be attached to each positive electrode of the battery cells 72.

The battery part 71 is provided with the four lead plates 73, which connect the three battery cells 72 in series to the terminal board 82. The first lead plate 731 is connected only to the positive electrode at the rear end of the first battery cell 721 and is connected to the terminal board 82. The second lead plate 732 connects the negative electrode at the front end of the first battery cell 721 to the positive electrode at the front end of the second battery cell 722. The third lead plate 733 connects the negative electrode at the rear end of the second battery cell 722 to the positive electrode at the rear end of the third battery cell 723. The fourth lead plate 734 is connected only to the negative electrode at the front end of the third battery cell 723 and is connected to a contact hole 832 (see FIG. 14) of the terminal board 82. Furthermore, insulating sheets 79 may be attached on the outer sides of the four lead plates 73. The three battery cells 72, which are thus longitudinally disposed in parallel in the left-right direction, are housed in the case 31 while being collectively supported by the cell holder 90.

Referring now to FIGS. 11-14, the circuit part (circuit) 81 generally comprises the terminal board 82 and the female terminals 84. The terminal board 82 is fixed to the upper surface of the cell holder 90 by a screw 89. In addition, the above-described four lead plates 73 are respectively connected to the terminal board 82 near a front-side-end edge and a rear-side-end edge of the terminal board 82. The plurality of (here, seven) female terminals 84 are attached to the upper surface of the terminal board 82 such that they are disposed in parallel in the left-right and front-rear directions. The seven female terminals 84 are configured (formed) as identical terminal components. The functions of the seven female terminals 84 as terminals differ in accordance with the location at which each female terminal 84 is attached to the terminal board 82.

Figure 13:
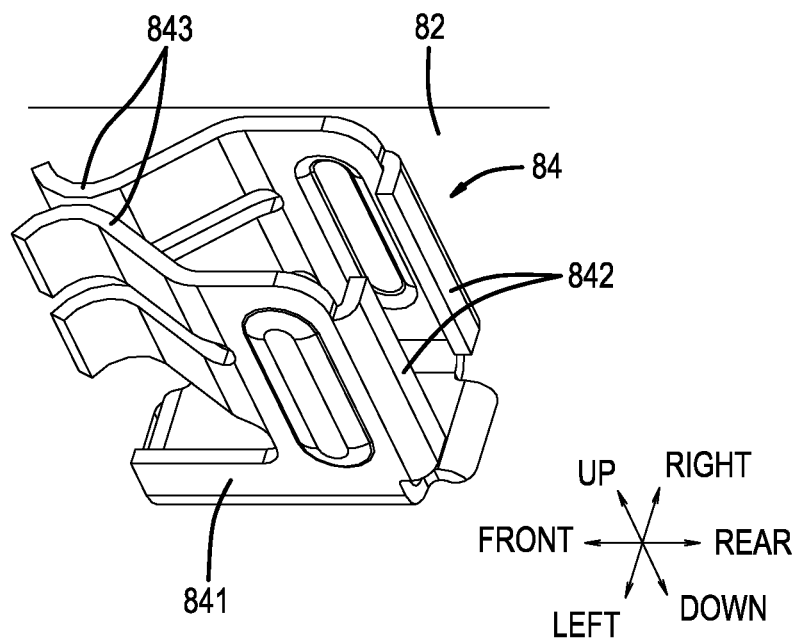
FIG. 13 is an enlarged oblique view of a female terminal.

As shown in FIG. 13, each female terminal 84 comprises, in order from below, a seat part 841, two frame parts 842, and two contact parts 843. The seat part 841, the contact parts 843, and the frame parts 842 are formed such that they are integrally linked. The seat part 841 is attached to the terminal board 82 and supports the frame parts 842, which respectively extend to the contact parts 843. The seat part 841 is formed as a flat plate that faces the terminal board 82, and a lower surface side of the seat part 841 is stuck into and thereby attached to the terminal board 82. The seat part 841 is physically and electrically connected to the terminal board 82, and is attached to and supported by the terminal board 82. The frame parts 842 link the seat part 841 and the contact parts 843. The frame parts 842 support the contact parts 843 while being supported by the seat part 841, which is supported by the terminal board 82. The frame parts 842 constitute a left-right pair, the same as the contact parts 843, which constitute a left-right pair. The frame parts 842 are elongated in the up-down direction, which is orthogonal to the front-rear sliding direction of the battery pack 30. To increase stiffness, the frame parts 842 are provided with a shape that is appropriately concave-convex in the left-right direction.

The left and right contact parts 843 supported by the frame parts 842 constitute a female terminal, into which one of the plate-shaped male terminals (i.e., the positive terminal 15, the negative terminal 16, or the communication terminal 17) can be inserted. The contact parts 843 are formed such that one side (i.e. the front terminal end/side thereof) possesses a flexible spring force owing to the other side (the rear base end) being supported in a cantilevered manner. That is, the one side of each of the contact parts 843 is linked to and supported by the corresponding frame part 842, and the other sides of the contact parts 843 are configured as electrical contacts into which the male terminal is inserted. Furthermore, the other sides of the contact parts 843 extend in the direction in which the battery pack 30 is slid when mounting and dismounting, and are formed such that they are inclined in mutually opposing directions (inward relative to each other) so that the male terminal can be inserted and squeezed between them.

Figure 11:
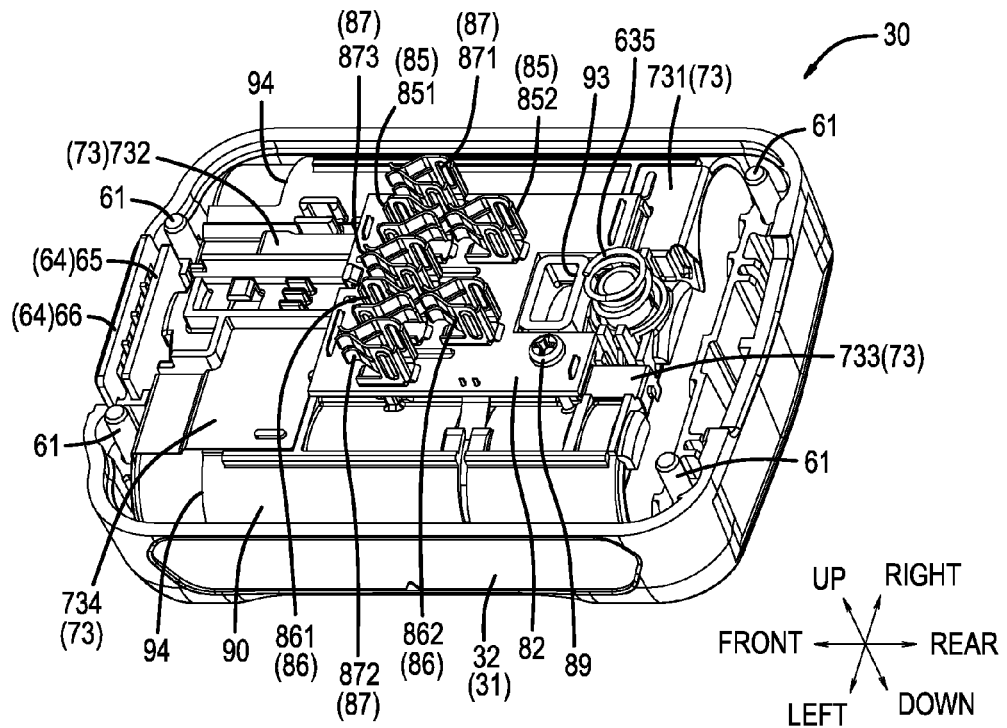
FIG. 11 is an internal oblique view of the battery pack, wherein only an upper case has been removed.
Figure 12:
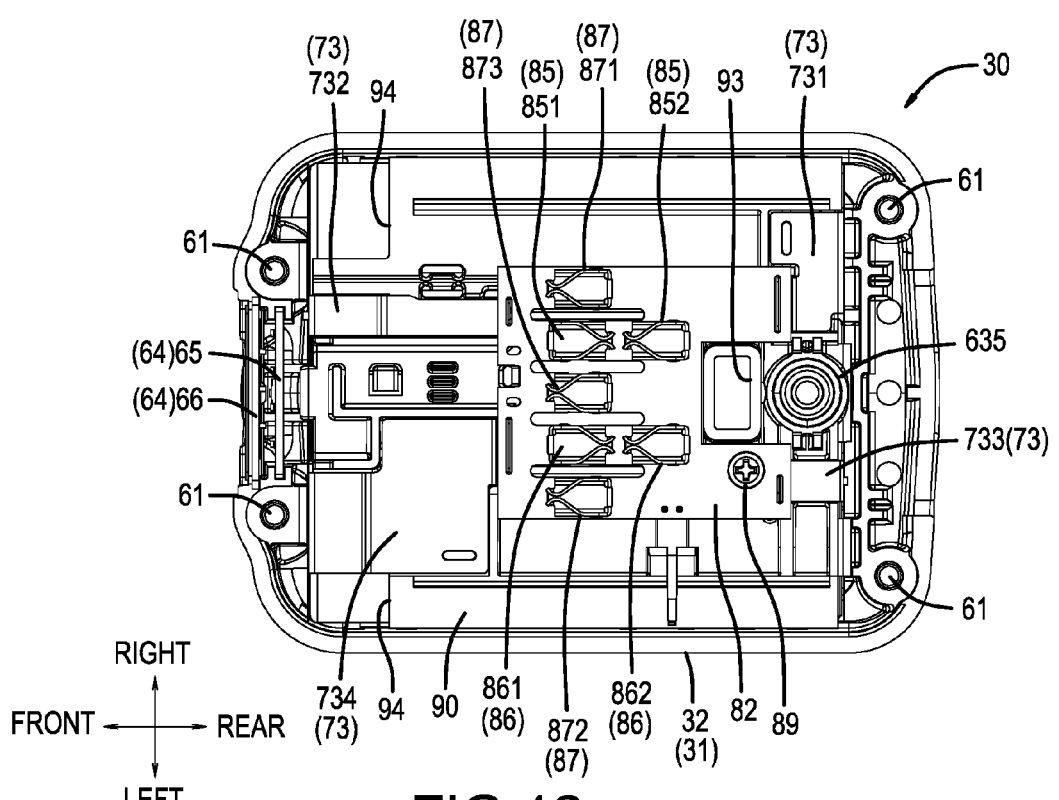
FIG. 12 is a top view of the battery pack shown in FIG. 11.

As illustrated, e.g., in FIGS. 11-12, the seven female terminals 84 are disposed in parallel and attached to the terminal board 82. The female terminals 84 constitute the two charging/discharging terminals 85, 86 and the three communication terminals 87 (871, 872, 873), which were mentioned above. The two charging/discharging terminals 85, 86 and the three communication terminals 87 are configured such that the five of them are disposed in parallel in the left-right direction with respect to the terminal board 82, the same as the above-described five slits 571, 572 of the upper case 51. Of the five female terminals 84 disposed in parallel in this manner, a total of three, that is, the two on the left and right sides and the one in the middle, are configured as the communication terminals 87.

Specifically, the first communication terminal 871 disposed on the right side is one of the female terminals 84 that functions as a battery-cell-voltage-monitor terminal, which communicates the voltage of two of the battery cells 72 connected in series (V1+V2) detected during charging to the charger 20. The second communication terminal 872 disposed on the left side, too, is one of the female terminals 84 that functions as a battery-cell-voltage-monitor terminal that communicates the voltage of one of the battery cells 72 (V1) detected during charging to the charger 20. In addition, the third communication terminal 873 disposed in the middle is the female terminal 84 that functions as a thermistor terminal that communicates the temperature of the battery cells 72 detected (by a thermistor disposed in the case 31) during charging and discharging. The first, second and third communication terminals 871-873 are all disposed such that their contact parts 843 face toward the front side.

The two charging/discharging terminals 85, 86 are respectively disposed in between the three communication terminals 87 in an alternating manner. That is, the first charging/discharging terminal 85 is disposed between the first communication terminal 871 on the right side and the third communication terminal 873 in the middle. The first charging/discharging terminal 85 constitutes the female terminal 84 that functions as a positive (battery) terminal during charging and discharging. The second charging/discharging terminal 86 is disposed between the second communication terminal 872 on the left side and the third communication terminal 873 in the middle. The second charging/discharging terminal 86 constitutes the female terminal 84 that functions as a negative (battery) terminal during charging and discharging. That is, of the five female terminals 84 disposed in parallel in the left-right direction on the terminal board 82, the first communication terminal 871 and the second communication terminal 872 are configured such that they are disposed on both the right and left outer sides, whereas the first (positive) charging/discharging terminal 85 and the second (negative) charging/discharging terminal 86 are configured such that they are disposed on the inner sides thereof.

Furthermore, the first, second and third communication terminals 871-873 each comprise only one of the female terminals 84. In contrast, the first and second charging/discharging terminals 85, 86 each comprise two of the female terminals 84 disposed in parallel (i.e. aligned) in the front-rear direction. That is, for both the first charging/discharging terminal 85 and the second charging/discharging terminal 86, two of the female terminals 84 are disposed in parallel in the insertion direction of the plate-shaped male terminals. In the present embodiment, the two female terminals 84 that respectively constitute each of the charging/discharging terminals 85, 86 are disposed such that their contact parts 843 face (directly oppose) one another. Specifically, the charging/discharging terminals 85, 86 comprise front-side terminals 851, 861 and rear-side terminals 852, 862. Thus, the contact parts 843 of the front-side terminals 851, 861 are disposed such that they face toward the rear side, and the contact parts 843 of the rear-side terminals 852, 862 are disposed such that they face toward the front side. In other words, the front-side terminals 851, 861 and the rear-side terminals 852, 862 are disposed such that they directly adjacent to (oppose) one another.

The charging/discharging terminals 85, 86 are the positive (battery) terminal and the negative (battery) terminal, respectively, during charging and discharging, and consequently constitute robust (strong) electric terminals (i.e. a terminal or terminals configured to handle high or strong currents), because 20 amps or more of current may flow through these terminals 85, 86. In contrast, the communication terminals 87 are terminals that communicate information related to the battery cells 72 and consequently constitute less robust (weak) electric terminals (i.e. a terminal or terminals configured to handle low or weak currents), because these terminals 87 are only required to conduct relatively low voltage/amperage electrical signals to the tool or charger microprocessor. In the present embodiment, the first to third communication terminals 871-873 are disposed such that they are adjacent to the front-side terminals 851, 861 of the charging/discharging terminals 85, 86 in the left-right direction. That is, in order from the right, the first communication terminal 871, the first charging/discharging terminal 85, the third communication terminal 873, the second charging/discharging terminal 86, and the second communication terminal 872 are disposed on the terminal board 82. The first communication terminal 871, the first charging/discharging terminal 85, the third communication terminal 873, the second charging/discharging terminal 86, and the second communication terminal 872 are disposed in parallel such that the directions in which the contact parts 843 of the female terminals 84 face alternate in the front-rear direction.

The first communication terminal 871, the first charging/discharging terminal 85, the third communication terminal 873, the second charging/discharging terminal 86, and the second communication terminal 872 are disposed in parallel and are arranged such that the less robust electric terminals alternate with the robust electric terminals in the left-right direction, which is the direction that the batteries are disposed in parallel. The terminal board 82 is provided with drain slits 881 between the first communication terminal 871, the first charging/discharging terminal 85, the third communication terminal 873, the second charging/discharging terminal 86, and the second communication terminal 872, which are disposed in parallel. Thus, a total of four of the drain slits 881 are provided, in parallel, between the five female terminals 84 disposed in parallel in the left-right direction.

Figure 14:
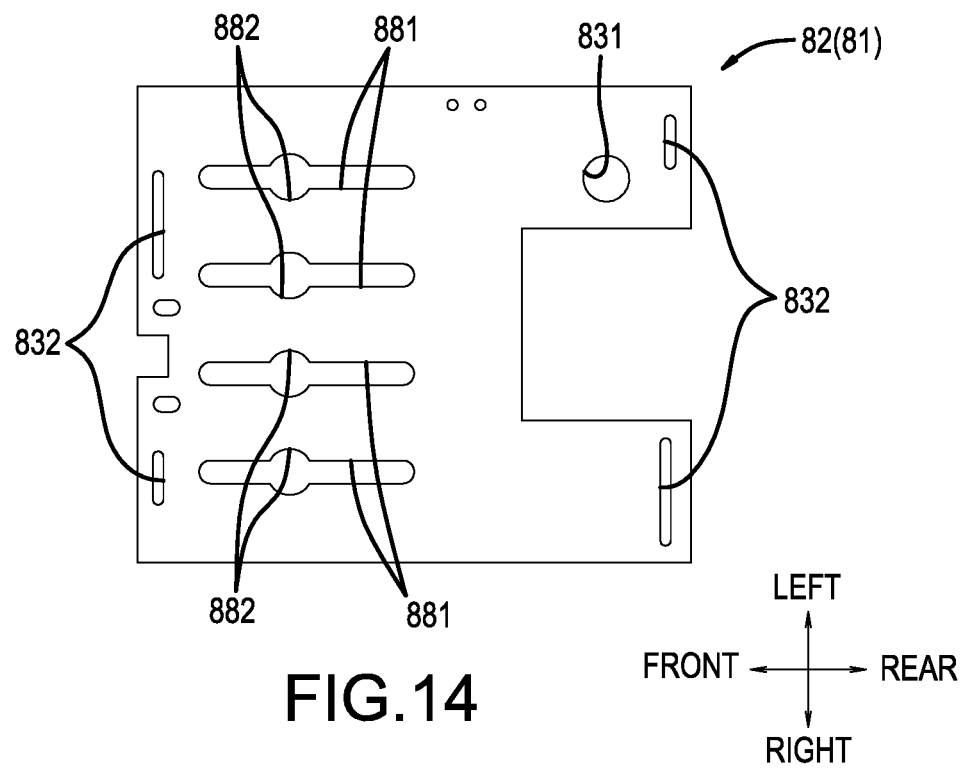
FIG. 14 is a rear view of a terminal board.

As shown in FIG. 14, each drain slit 881 includes a circular-hole 882, which has a width (diameter) greater than the width of the rest of the drain slit 881. Each circular-hole 882 enlarges, although slightly, the slit width of its drain slit 881. The circular-holes 882 respectively prevent the generation of surface tension in any water that may have entered into the interiors of the drain slits 881. As a result, water that has entered into the interiors of the drain slits 881 is drained via the circular-holes 882 without pooling (collecting) in the interiors of the drain slits 881. Therefore, by providing the drain slits 881, adjacent female terminals 84 can be prevented from electrically shorting to one another in an adverse manner in the event that water were to reach the terminal board 82. It is noted that reference number 831 denotes an insertion hole for the insertion of the screw 89, and reference numbers 832 denote contact holes for the connection of the lead plates 73.

Figure 7:
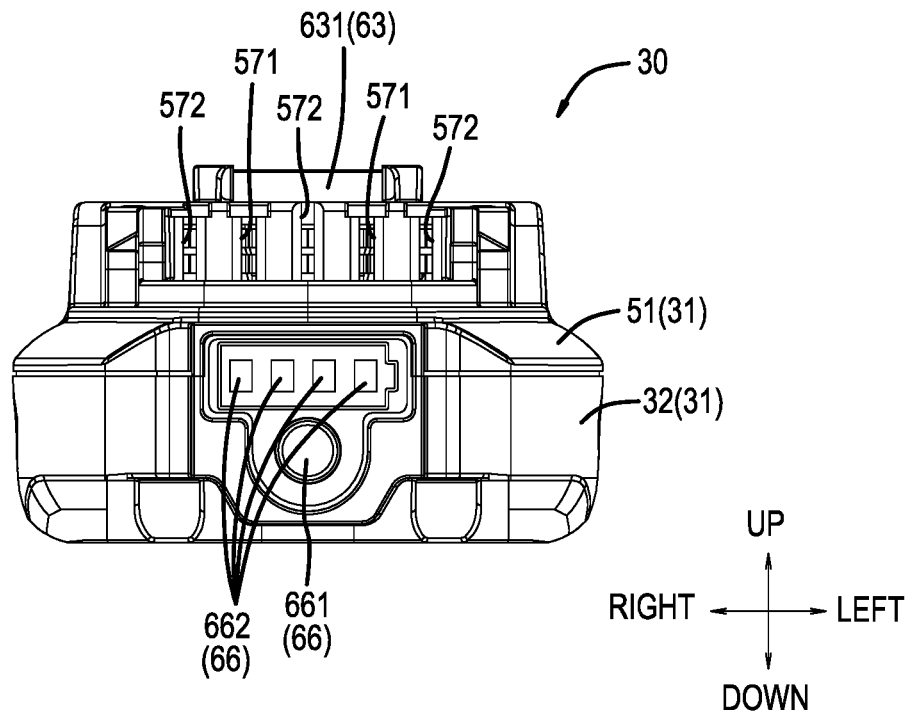
FIG. 7 is a front view of the battery pack shown in FIG. 1.
Figure 8:
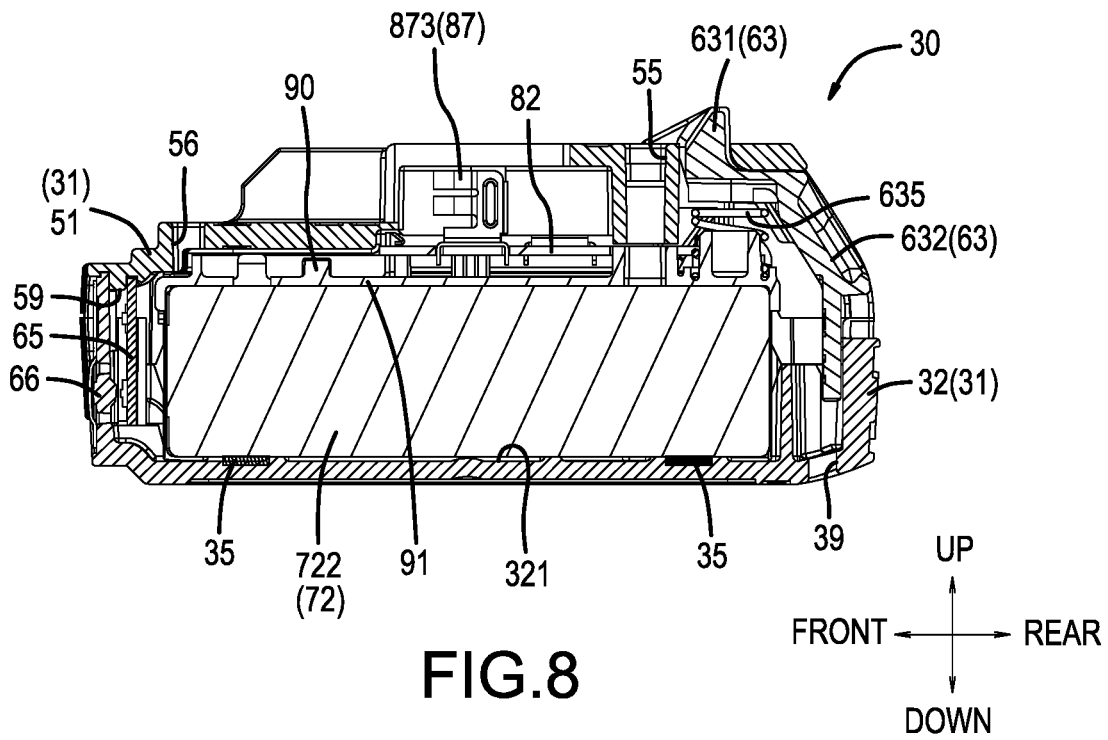
FIG. 8 is a cross-sectional view (auxiliary cross-section) that shows a cross-section taken along line (VIII)-(VIII) in FIG. 6.

Referring now to FIGS. 7-12, an LED-display apparatus 64 is provided on the front surface of the lower case 32. As shown in FIG. 10 to FIG. 12, the LED-display apparatus 64 comprises an LED board 65 and the LED label 66. The LED board 65 is configured such that it is capable of indicating (displaying), by turning on (illuminating) one or more LEDs, the remaining charge of the three battery cells 72. These LEDs are capable of indicating four levels of remaining charge of the three battery cells 72. As shown in FIG. 7, the LED label 66 comprises a pushbutton part 661 and LED-transmissive (transparent) parts 662. By depressing the pushbutton part 661, the illuminated LED(s) of the LED board 65 is (are) visible through the LED-transmissive parts 662. Furthermore, the LED board 65 and the LED label 66 are held between the lower case 32 and the upper case 51.

In addition, a male-hook mechanism 63 is movably provided in the case 31. The male-hook mechanism 63 has a structure wherein, when the battery pack 30 is mounted by being slid onto the battery-mounting part 21, the male-hook mechanism 63 latches onto the female hook 23 of the battery-mounting part 21. As shown in FIG. 10, the male-hook mechanism 63 comprises the male hook 631 and the manipulation part (button) 632, which are integral (one piece). The male hook 631 and the manipulation part 632 are biased by a biasing spring 635 to protrude outwardly such that the male hook 631 latches onto the female hook 23. Furthermore, when the manipulation part 632 is pulled down against the biasing force of the biasing spring 635, the latching of the male hook 631 to the female hook 23 can be released, and thereby the battery pack 30 can be removed from the battery-mounting part 21.

As was noted above, the three battery cells 72, together with the cell holder 90, are housed and supported in the interior of the lower case 32. That is, the three battery cells 72 are housed and supported by the lower case 32, and the cell holder 90 is disposed on the upper side of the battery cells 72. The cell holder 90 is provided with cell-housing recessed parts (recesses or depressions) 91 (see e.g., FIGS. 18-19), which are respectively formed to hold and house the three battery cells 72 in parallel. The cell-housing recessed parts 91 are proximate to the respective outer-circumferential surfaces 75 of the battery cells 72 and have a shape (in the left-right direction) that extends along the circumferential directions of the outer-circumferential surfaces 75 of the battery cells 72. Longitudinally-extending ridges (ribs) between the cell-housing recessed parts 91 are respectively disposed between the battery cells 72 such that the ridges of the cell-housing recessed parts 91 extend between and interleave adjacent battery cells 72. In addition, a female thread 92, into which the screw 89 for fixing the terminal board 82 is screwed, is provided in the upper surface of the cell holder 90. The cell holder 90 has a shape that supports the above-described four lead plates 73 such that they can be connected to the terminal board 82. Furthermore, the cell holder 90 provides one representative, non-limiting example of an interposed member according to the present teachings.

The cell holder 90 is provided with a first ventilation opening 93, which enables the cooling draft that enters through the air-inlet port 55 into the interior of the case 31 to blow against the battery cells 72. The first ventilation opening 93 is defined at a location that faces the air-inlet port 55 of the upper case 51, and has an opening shape designed to communicate the cooling draft from the upper side to the lower side of the cell holder 90. The air-inlet port 55 and the first ventilation opening 93 are disposed on the front side of the male-hook mechanism 63. In addition, the cell holder 90 is provided with second ventilation openings 94 for exhausting the draft(s) that has (have) been blown against the battery cells 72. The second ventilation openings 94 are defined at locations that substantially face the exhaust ports 56 of the upper case 51, and have an opening shape such that they are designed to communicate the cooling draft(s) from the lower side to the upper side of the cell holder 90.

Figure 15:
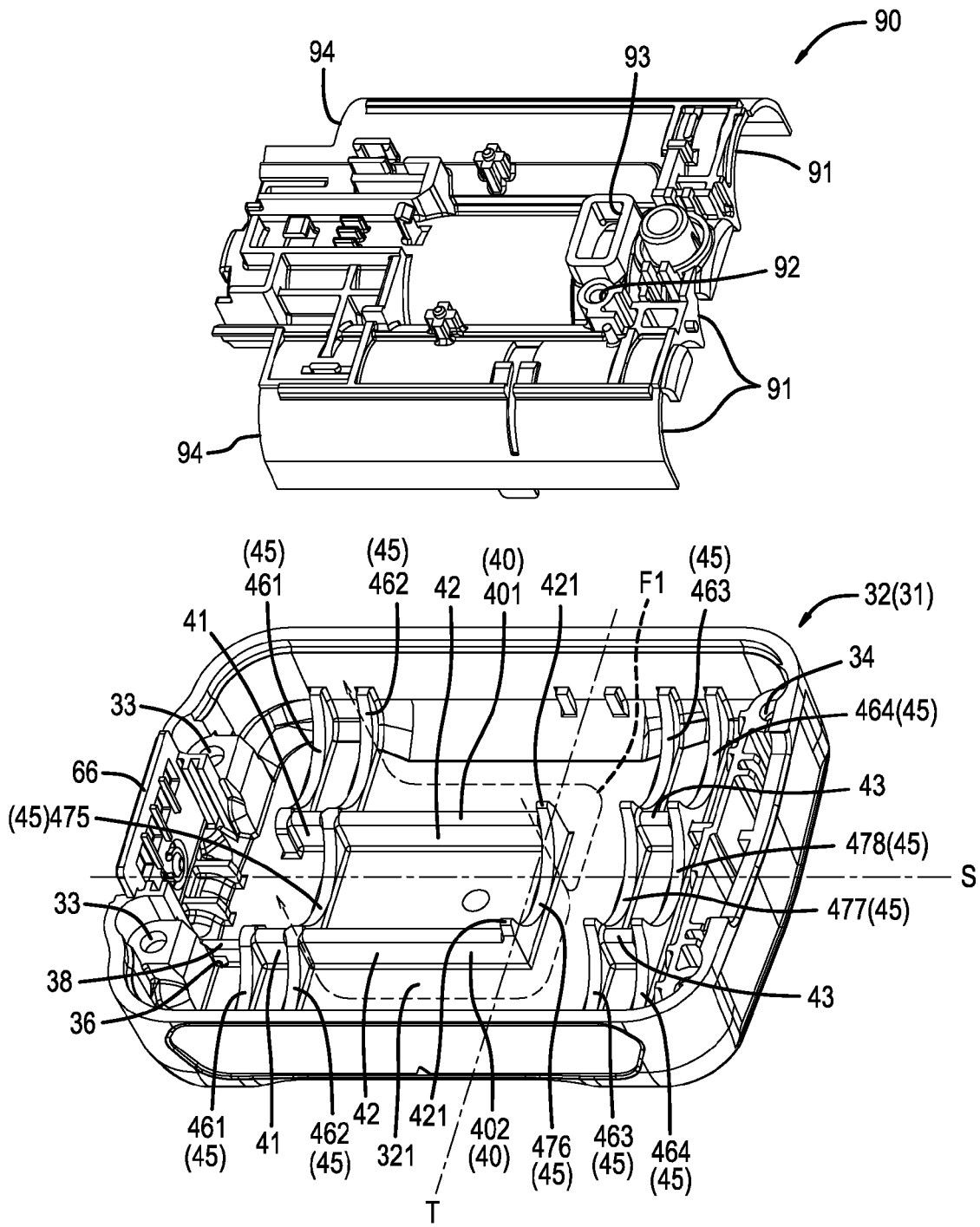
FIG. 15 is an oblique view that shows only a lower case and a cell holder.

In the present embodiment, the first ventilation opening 93 and the second ventilation openings 94 function to guide the cooling draft, which enters through the air-inlet port 55 and exits from (through) the exhaust ports 56, in the interior of the case 31. The first ventilation opening 93 and the second ventilation openings 94 respectively serves as an inlet and outlets of the ventilation path according to the present teachings. The structures, which extend through the cell holder 90 in the up-down direction and define these openings 93, 94, provide representative, non-limiting examples of draft-guiding parts of the present teachings. As shown in FIG. 15, the cooling draft (F1) that passes through the first ventilation opening 93 is split and thus a first portion (i) passes through, from above to below, a first semicircular space between the first battery cell 721 and the second battery cell 722, and a second portion (ii) passes through, from above to below, a second semicircular space between the second battery cell 722 and the third battery cell 723. The two split cooling drafts are then recombined in a second ventilation-path volume (chamber) Q2 (see e.g., FIG. 16) that is located adjacent the inner bottom surface 321 of the lower case 32. These two cooling drafts, while passing through, from above to below, the two spaces between the battery cells 72, cool the battery cells 72. It is noted that this cooling is called a "first cooling" in the following description.

Figure 16:
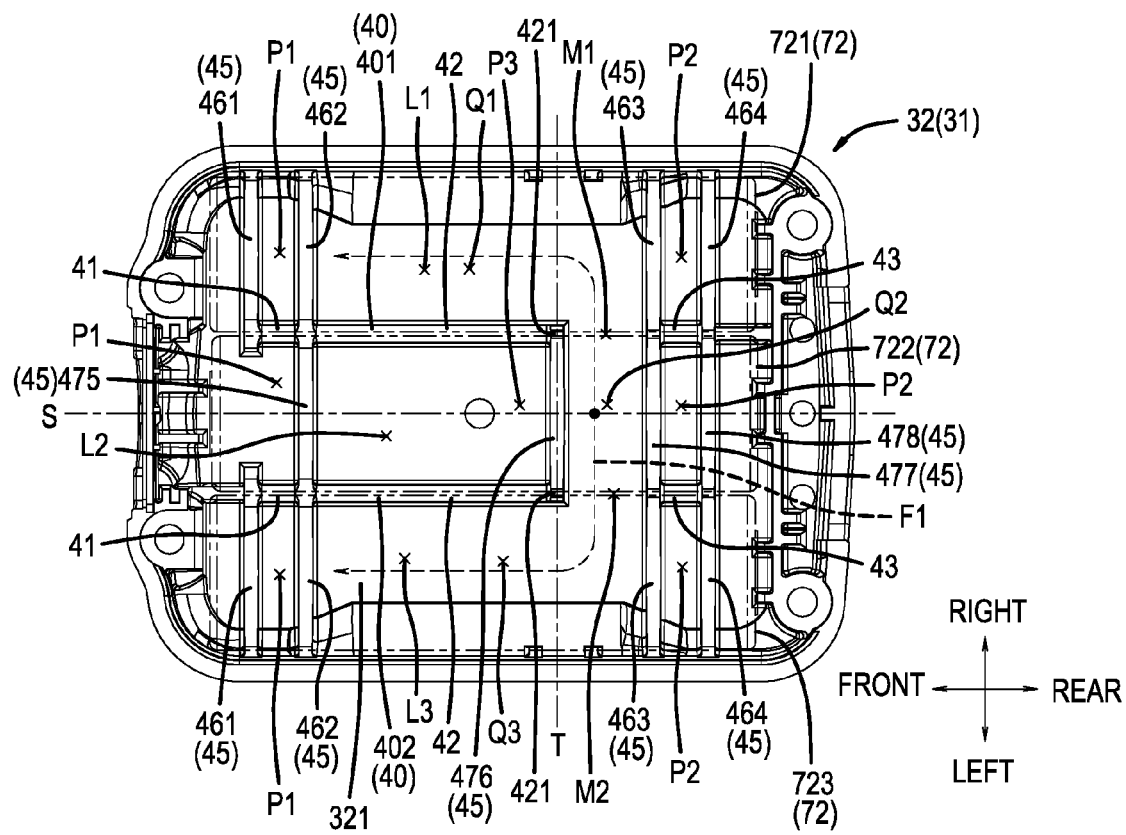
FIG. 16 is a top view of the lower case.

As shown in FIG. 15 and FIG. 16, the left-right-partitioning ribs 40 and the front-rear-partitioning ribs 45 are provided on the inner bottom surface 321 of the lower case 32. The left-right-partitioning ribs 40 serve as partitions, in the left-right direction, between (three) housing volumes (chambers) L1, L2, L3 of the three battery cells 721, 722, 723 disposed in parallel in the left-right direction. Specifically, a first left-right-partitioning rib 401 serves as a partition between the first housing volume L1 of the first battery cell 721 and the second housing volume L2 of the second battery cell 722. In addition, a second left-right-partitioning rib 402 serves as a partition between the second housing volume L2 of the second battery cell 722 and the third housing volume L3 of the third battery cell 723.

The rib shape of the left-right-partitioning ribs 40 (the first left-right-partitioning rib 401, the second left-right-partitioning rib 402) protrudes toward the upper side (upward) from the inner bottom surface 321 of the lower case 32 and also extends in the front-rear direction. The first left-right-partitioning rib 401 and the second left-right-partitioning rib 402 are formed with shapes having left-right symmetry with respect to a left-right centerline S. The first left-right-partitioning rib 401 and the second left-right-partitioning rib 402 can each be functionally divided into, in order from the front side, front-mat-support parts 41, partitioning single parts 42, and rear-mat-support parts 43. Here, the front-mat-support parts 41 and the partitioning single parts 42 are formed such that they are linked (physically connected) in the front-rear direction; in contrast, the partitioning single parts 42 and the rear-mat-support parts 43 are formed such that they are spaced apart in the front-rear direction and are thereby divided. Furthermore, spaces M1, M2, which are defined such that the rib shapes are divided into the partitioning single parts 42 and the rear-mat-support parts 43, are configured as distribution paths that distribute the air flow from the second housing volume L2 to the first housing volume L1 and to the third housing volume L3.

The partitioning single part 42 of the first left-right-partitioning rib 401 is formed such that it separates the first housing volume L1 from the second housing volume L2. The partitioning single part 42 of the second left-right-partitioning rib 402 is formed such that it separates the second housing volume L2 from the third housing volume L3. The partitioning single parts 42 are formed such that they protrude toward the upper side (upward) from the inner bottom surface 321 of the lower case 32 until they are proximate to the outer-circumferential surfaces of the battery cells 72. The front-mat-support parts 41 and the rear-mat-support parts 43 are configured such that they sandwich the ribs 352 of the cushioning mats 35 from the lower side, and thereby the front-mat-support parts 41 and the rear-mat-support parts 43 are pressed against the cushioning mats 35. Furthermore, the length of the width in the left-right direction and the length of protrusion in the up-down direction of the front-mat-support parts 41, the partitioning single parts 42, and the rear-mat-support parts 43 are set to the same length.

In contrast, the front-rear-partitioning ribs 45 are provided such that they partition, in the front-rear direction, the housing volumes L1, L2, L3 of the three battery cells 721, 722, 723 disposed in parallel in the left-right direction. The rib shapes of the front-rear-partitioning ribs 45 are configured such that they are all the same. That is, the front-rear-partitioning ribs 45 are proximate to the outer-circumferential surfaces 75 of the battery cells 72 and have shapes that extend along the circumferential directions of the outer-circumferential surfaces 75 of the battery cells 72, the same as the above-described cell-housing recessed parts 91 of the cell holder 90. Consequently, the front-rear-partitioning ribs 45 are also designed with two points (ribs) that respectively intervene between adjacent battery cells 72, the same as the front-mat-support parts 41 and the rear-mat-support parts 43. The front-rear-partitioning ribs 45 each provide representative, non-limiting examples of a fixing wall according to the present teachings. That is, the front-rear-partitioning ribs 45 are provided on the inner bottom surface 321 of the case 31 and make contact with the outer-circumferential surfaces 75 of the battery cells 72.

Specifically, the front-rear-partitioning ribs 45 demarcate (bound) the mat-support areas P1, P2, which provide support, and the ventilation-path volumes (chambers) Q1, Q2, Q3. The ventilation-path volumes Q1, Q2, Q3 each constitute portions of the ventilation path according to the present teachings. The front-rear-partitioning ribs 45 partition, in the front-rear direction, the first housing volume L1 from the third housing volume L3 in the same manner. The front-rear-partitioning ribs 45 isolate the ventilation volumes (chambers) of the ventilation-path volumes Q1, Q2, Q3, i.e. portions of the ventilation path, from the lead plates 73 (731, 732, 733, 734), which constitute electrode-end surfaces of the battery cells 72. That is, the first housing volume L1 and the third housing volume L3 are provided with, in order from the front, first partitioning ribs 461, second partitioning ribs 462, third partitioning ribs 463, and fourth partitioning ribs 464.

More specifically, the first partitioning ribs 461 and the second partitioning ribs 462 partition the housing volumes L1, L3 so as to define the front-mat-support areas P1. The second partitioning ribs 462 and the third partitioning ribs 463 partition the housing volumes L1, L3 so as to define the ventilation-path volumes Q1, Q3. The third partitioning ribs 463 and the fourth partitioning ribs 464 partition the housing volumes L1, L3 so as to define the rear-mat-support areas P2. That is, the second partitioning ribs 462 and the third partitioning ribs 463 function like partitions (walls) that block the flow of the cooling draft(s). Consequently, the ingress of the cooling draft(s) into the front side (portion) of the case 31 is restricted (blocked or impeded) by the front-mat-support areas P1, and the ingress of the cooling draft(s) into the rear side (portion) of the case 31 is restricted (blocked or impeded) by the rear-mat-support areas P2. Furthermore, the cooling draft, which passes through the first ventilation opening 93 and is supplied to the inner bottom surface 321, is thus supplied to the second ventilation-path volume Q2, which is a section of and constitutes the second housing volume L2. The second ventilation-path volume Q2 is a ventilation-path volume (chamber) that constitutes the second housing volume L2 and is demarcated (bounded) by a sixth partitioning rib 476 and a seventh partitioning rib 477, which will be explained next.

The manner in which the second housing volume L2 is partitioned in the front-rear direction by the front-rear-partitioning ribs 45 differs slightly from the manner in which the first housing volume L1 is partitioned from the third housing volume L3. That is, in the second housing volume L2, there are no ribs that correspond to the first partitioning ribs 461 provided in the housing volumes L1, L3. Instead, the second housing volume L2 is provided with the sixth partitioning rib 476, which is not provided in the housing volumes L1, L3. Specifically, in order from the front, a fifth partitioning rib 475, the sixth partitioning rib 476, the seventh partitioning rib 477, and an eighth partitioning rib 478 are provided. Furthermore, the fifth partitioning rib 475 is linked (physically connected) in the left-right direction with the above-described second partitioning ribs 462. The seventh partitioning rib 477 is linked (physically connected) in the left-right direction with the above-described third partitioning ribs 463. The eighth partitioning rib 478 is linked (physically connected) in the left-right direction with the above-described fourth partitioning ribs 464.

The sixth partitioning rib 476 is linked (physically connected) to rear ends 421 of the partitioning single parts 42 on both the left and right sides, thereby forming a right-angled (rectangular) shape. Consequently, in an intermediate volume of only the second housing volume L2, the sixth partitioning rib 476 separates an ingress-restricted region P3 and the second ventilation-path volume Q2 in the front-rear direction. Specifically, the second ventilation-path volume Q2 is defined as a space (chamber) of the second housing volume L2 that is located on the rear side of the sixth partitioning rib 476. The second ventilation-path volume Q2 is a space (chamber) that receives the cooling draft, which has first passed through the first ventilation opening 93 and then passed between the battery cells 72. The ingress-restricted region P3 is defined as a space (chamber) of the second housing volume L2 that is located on the front side of the sixth partitioning rib 476. The ingress-restricted region P3 is a space (chamber) wherein the ingress, into the front side, of the cooling draft supplied to the second ventilation-path volume Q2 is restricted (blocked or impeded) by the sixth partitioning rib 476. Thus, the cooling draft whose ingress is restricted by the sixth partitioning rib 476 flows via the above-described spaces M1, M2 from the second ventilation-path volume Q2 (the second housing volume L2) to the first ventilation-path volume Q1 (the first housing volume L1) and to the third ventilation-path volume Q3 (the third housing volume L3), respectively. Thereafter, the cooling draft flows from the rear side, which is the base-end side of the battery cells 72 in the length direction, to the front side, which is the tip side of the battery cells 72 in the length direction.

That is, the spaces M1, M2 and the sixth partitioning rib 476 may serve as a divided-duct part according to the present teachings. That is, the spaces M1, M2 and the sixth partitioning rib 476 function such that the cooling draft that flows from the rear side to the front side is divided in two (split) in the left-right direction, which is the direction that the battery cells 72 are disposed in parallel. In other words, the cooling draft branches via the spaces M1, M2, as shown by the cooling draft(s) F1 in FIG. 15 and FIG. 16. Thus, the cooling draft that flows from the second ventilation-path volume Q2 (the second housing volume L2) to the first ventilation-path volume Q1 (the first housing volume L1) and to the third ventilation-path volume Q3 (the third housing volume L3) cools the battery cells 72 (721, 723) that are present in those spaces (chambers). That is, after the cooling draft cools the second battery cell 722, which faces the second ventilation-path volume Q2 (the second housing volume L2), the cooling draft is split such that one portion (upper line F1 in FIG. 16) cools the first battery cell 721, which faces (contacts) the first ventilation-path volume Q1 (is disposed in the first housing volume L1), and another portion (lower line F1 in FIG. 16) cools the third battery cell 723, which faces (contacts) the third ventilation-path volume Q3 (is disposed in the third housing volume L3). It is noted that this cooling is called a "second cooling" in the following description.

The second ventilation-path volume Q2 (which is located in the second housing volume L2), the first ventilation-path volume Q1 (which is located in the first housing volume L1), and the third ventilation-path volume Q3 (which is located in the third housing volume L3) each provide representative, non-limiting examples of a longitudinal-direction passageway according to the present teachings. That is, the first, second and third ventilation-path volumes Q1-Q3 are spaces (chambers) wherethrough the cooling drafts flow along the longitudinal direction of the battery cells 72, and these three spaces are provided in the direction that the battery cells 72 are disposed in parallel. In addition, the sixth partitioning rib 476 provides one representative, non-limiting example of a branch part according to the present teachings. The sixth partitioning rib 476 branches the cooling draft from the air-inlet port 55, and the two resulting (split) cooling drafts can respectively flow into the two spaces, i.e. into the first ventilation-path volume Q1 (which is located in the first housing volume L1) and into the third ventilation-path volume Q3 (which is located in the third housing volume L3). Furthermore, the sixth partitioning rib 476 also functions to hold the second battery cell 722. The seventh partitioning rib 477 and/or the bottom surface 321 of the case 31 may also cooperate with the sixth partitioning rib 476 in branching (dividing) the cooling draft.

As shown in FIG. 15 and FIG. 16, the position (the dot-dashed line identified by reference letter T) of the sixth partitioning rib 476 in the front-rear direction, which rib 476 at least partially defines the second ventilation-path volume Q2 in the second housing volume L2, is nearer to (is located on) the rear side with respect to the middle. That is, the sixth partitioning rib 476, which constitutes a part of the divided-duct part, is relatively nearer the location of the rear ends than the front ends of the battery cells 72. In other words, the sixth partitioning rib 476 is disposed (defined) on the upstream side of the drafts that flow from the center of the battery cells 72 in the longitudinal direction. In addition, the ingress-restricted region P3, which is located on the front side of the sixth partitioning rib 476, is demarcated (bounded) in the left-right direction by the partitioning single parts 42 on both the left and right sides. Consequently, the portion of the second battery cell 722, which faces the ingress-restricted region P3, is not cooled by the cooling draft. That is, in the "second cooling", the cooling drafts that flow to the first ventilation-path volume Q1 and the third ventilation-path volume Q3 are configured such that they cool over (for) a distance or time longer than does the cooling draft that flows to (through) the second ventilation-path volume Q2. It is noted that the first ventilation-path volume Q1, the second ventilation-path volume Q2, and the third ventilation-path volume Q3 each provide representative, non-limiting examples of cell-holding chambers (parts) according to the present teachings, and each holds (accommodates) one of the battery cells 72 in the interior of the lower case 32.

The cooling drafts, which flow from the rear side to the front side in the first ventilation-path volume Q1 and in the third ventilation-path volume Q3, blow against the second partitioning ribs 462 on the downstream side. As a result, the second partitioning ribs 462 redirect (divert) the flow of the cooling drafts, which have flown from the rear side to the front side, upwardly toward the outer-circumferential surfaces 75 of the battery cells 72. Specifically, the second partitioning ribs 462 guide the cooling drafts such that the cooling drafts flow toward the upper side where the battery cells 72 are present. Therefore, the second partitioning ribs 462 each provide a representative, non-limiting example of a circumferential-surface-directing part according to the present teachings. The cooling drafts guided by the second partitioning ribs 462 respectively pass, from below to above, through the first space between the first battery cell 721 and the second battery cell 722 and through the second space between the second battery cell 722 and the third battery cell 723, and are respectively discharged to the upper side via the second ventilation openings 94 of the cell holder 90. Consequently, the two cooling drafts cool in between the battery cells 72 while passing, from below to above, through the first and second spaces between the battery cells 72. It is noted that this cooling is called a "third cooling" in the following description.

Figure 3:
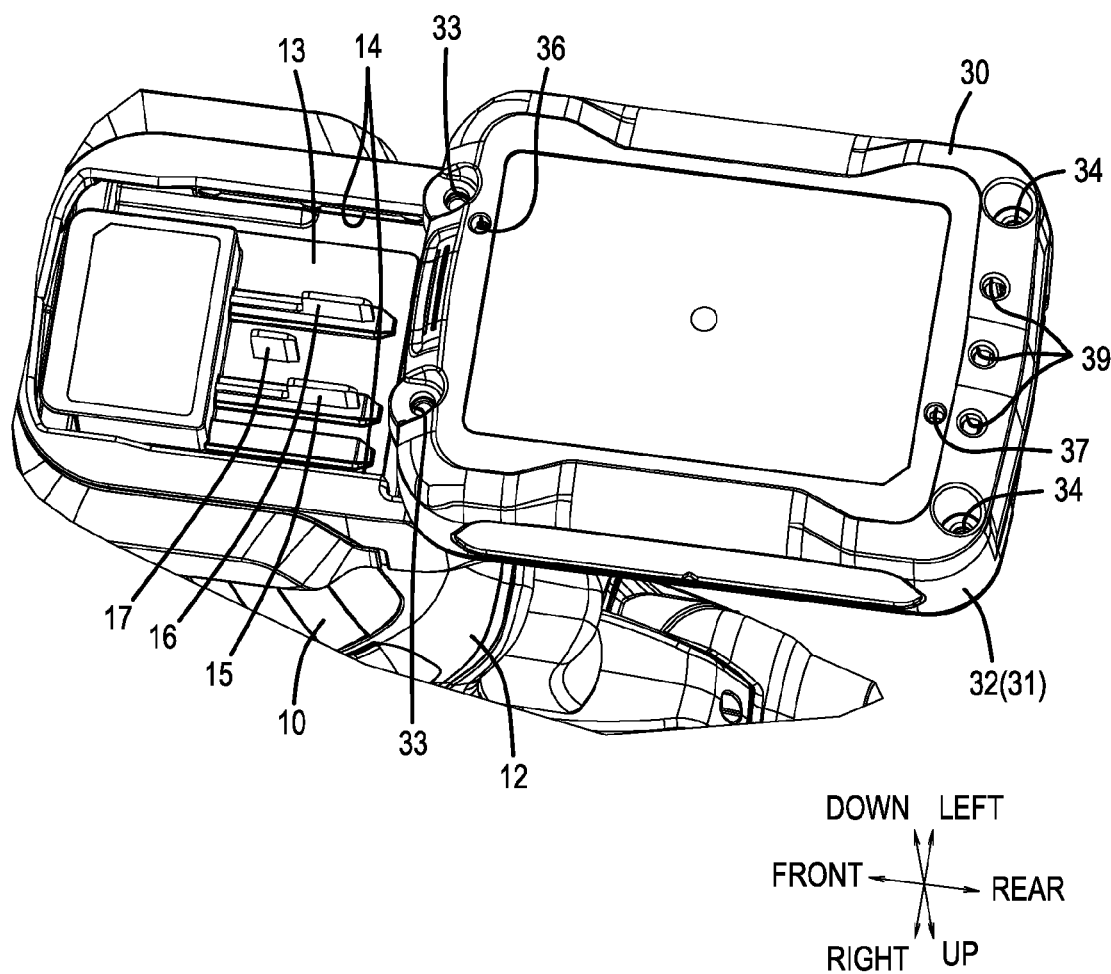
FIG. 3 is a lower-side oblique view that shows the point in time when the battery pack in FIG. 1 is to be mounted on the tool main body.
Figure 17:
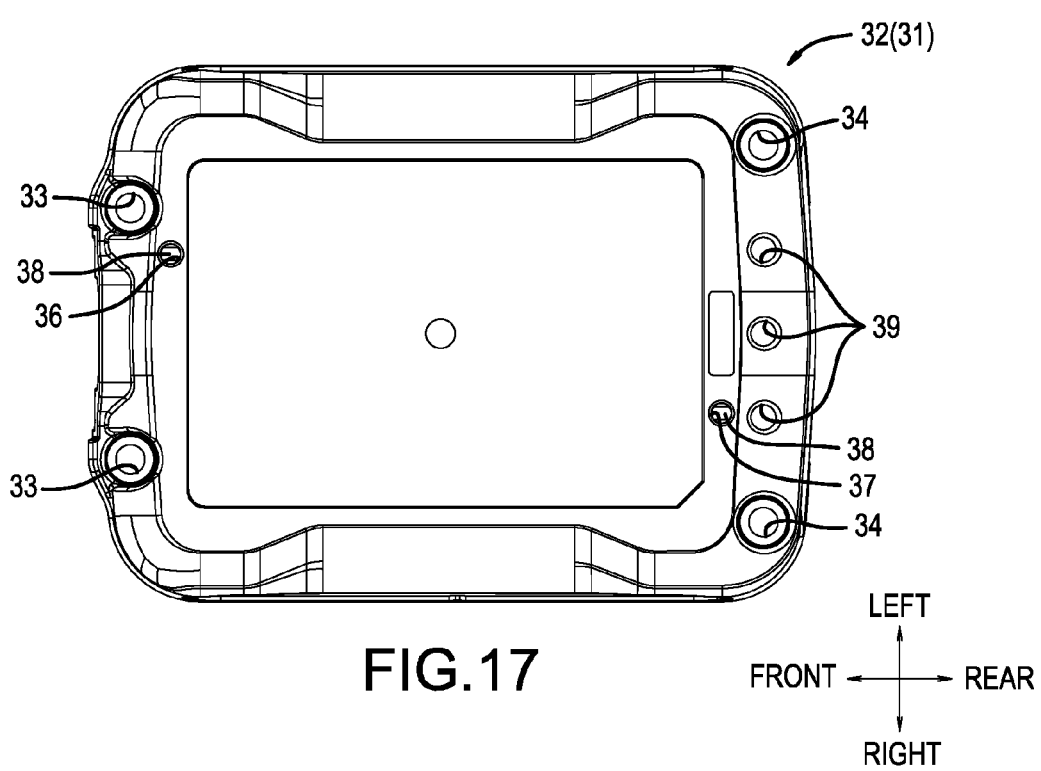
FIG. 17 is a bottom view of the lower case.

As shown in FIG. 3 and FIG. 17, a front-side-drain hole 36 and a rear-side-drain hole 37 are provided in the inner bottom surface 321 of the lower case 32. The front-side-drain hole 36 is configured such that it is located, in the inner bottom surface 321 of the lower case 32, between the second lead plate 732 and the fourth lead plate 734. That is, the front-side-drain hole 36 is provided such that any water that has pooled (collected) between the second lead plate 732 and the fourth lead plate 734 drains to the lower side. In addition, the rear-side-drain hole 37 is provided such that it is located, in the inner bottom surface 321 of the lower case 32, between the first lead plate 731 and the third lead plate 733. That is, the rear-side-drain hole 37 is configured such that any water that has pooled (collected) between the first lead plate 731 and the third lead plate 733 drains to the lower side.

Furthermore, as shown in FIG. 15 and FIG. 17, foreign-matter-ingress-restricting ribs 38 are provided on an inner side of the front-side-drain hole 36 and the rear-side-drain hole 37. The foreign-matter-ingress-restricting ribs 38 function such that, while allowing water in the interior of the case 31 to drain (exit) via the drain holes 36, 37, they restrict (block or impede) the ingress of foreign matter from the exterior into the interior of the case 31 via the drain holes 36, 37. It is noted that reference numbers 39 shown in FIG. 3 and FIG. 17 are drain holes for draining, to the lower side, any water that has entered via the hook opening 581, the manipulation opening 582, or the like provided in the upper case 51.

Figure 18:
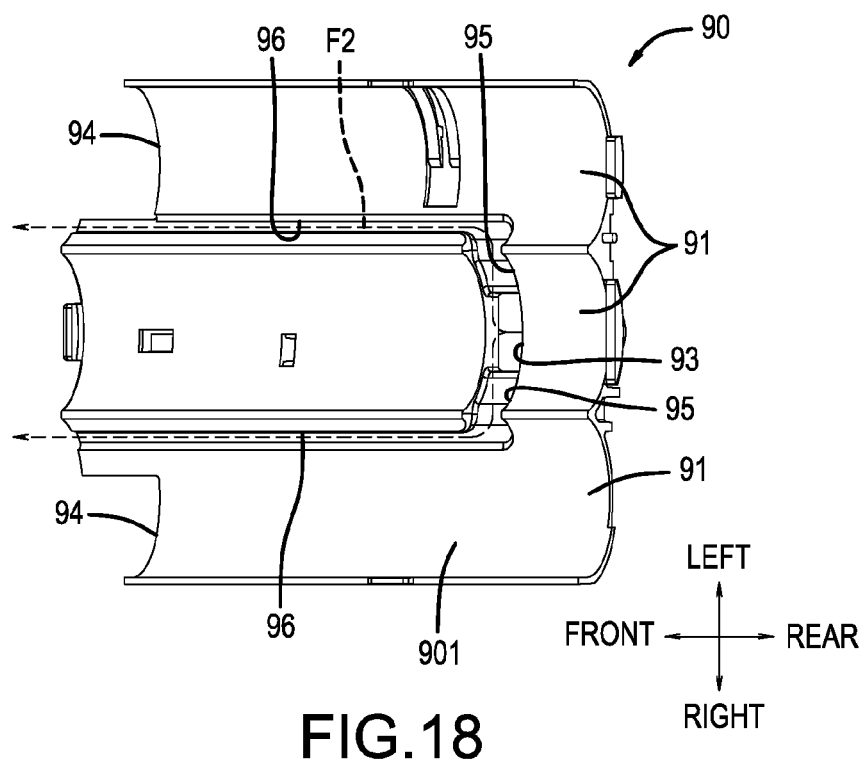
FIG. 18 is a bottom oblique view of the cell holder.
Figure 19:
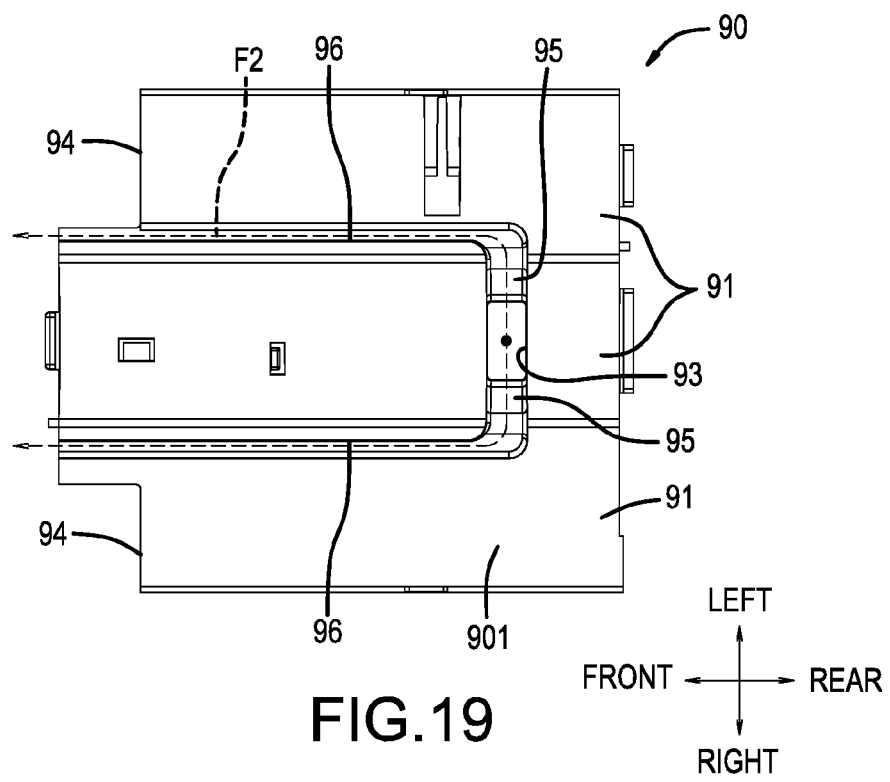
FIG. 19 is a bottom plan view of the cell holder.
Figure 20:
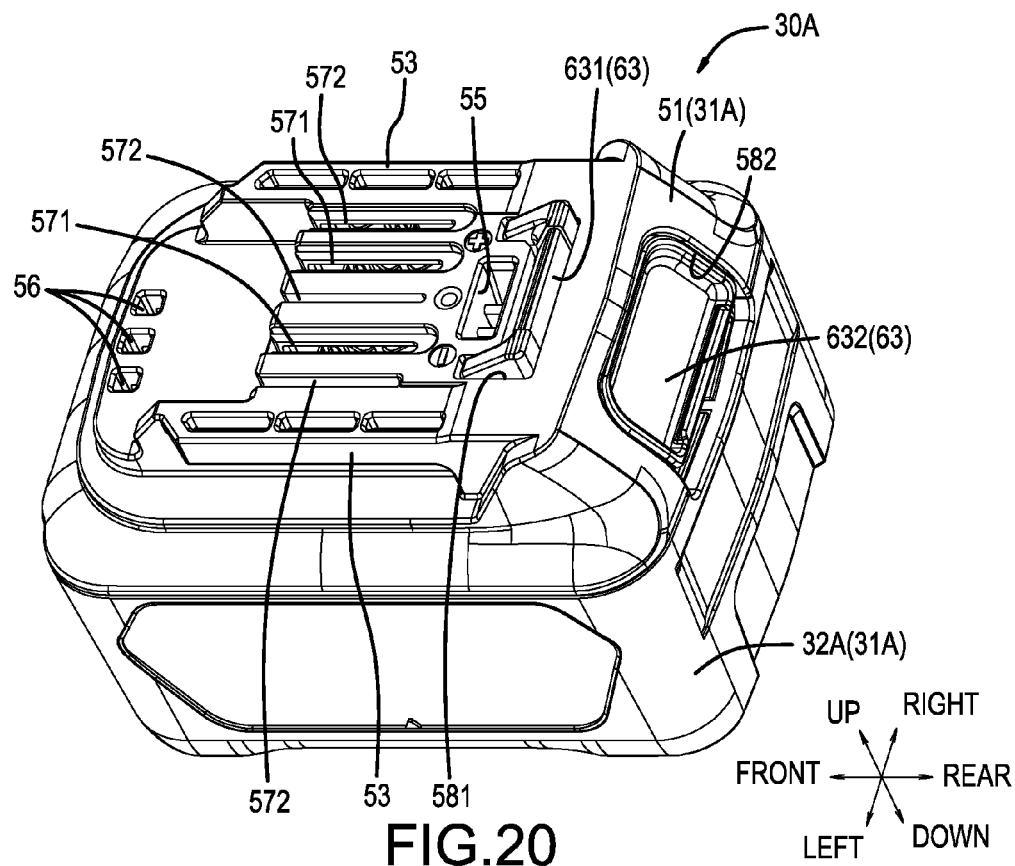
FIG. 20 is an oblique view of a battery pack according to a second embodiment.
Figure 21:
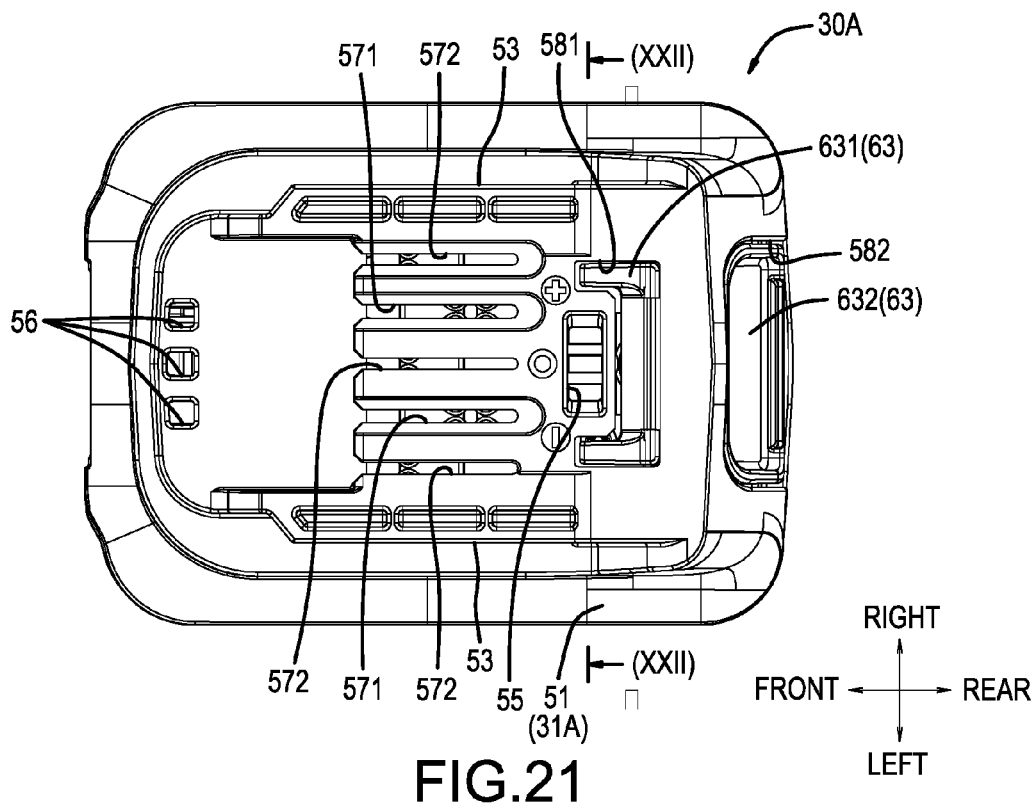
FIG. 21 is a top view of the battery pack shown in FIG. 20.

As shown in FIG. 18 and FIG. 19, draft-guiding grooves 95, 96, which also serve to guide cooling drafts (F2), are provided (defined) in a lower surface 901 of the cell holder 90. As was noted above, the cell holder 90 is disposed in the interior of the case 31 and holds the battery cells 72. It is noted that reference letter F2 indicates a cooling draft that flows through the grooves 95, 96. More specifically, the first draft-guiding grooves 95 are provided in the lower surface 901 of the cell holder 90 on both the left and right sides of the first ventilation opening 93. The first draft-guiding grooves 95 are provided by molding or forming (notching) portions of the cell-housing recessed parts 91 into groove shapes on both the left and right sides of the first ventilation opening 93. In other words, the first draft-guiding grooves 95 are formed by molding or forming (notching) portions of the lower surface 901 into the groove shapes, which are indented toward the upper side, such that the groove shapes (95) respectively extend in the left-right directions from both the left and right ends of the first ventilation opening 93. In addition, at end parts of the first draft-guiding grooves 95, the second draft-guiding grooves 96 are formed such that they extend toward the front side. The second draft-guiding grooves 96 are also formed by molding or forming (notching) portions of the lower surface 901 into groove shapes, which are indented toward the upper side.

The first draft-guiding grooves 95 and the second draft-guiding grooves 96 are fluidly connected (in fluid communication). The draft-guiding grooves 95, 96 divide the cooling draft supplied (F2) via the first ventilation opening 93 into two cooling drafts, one on the left and one on the right, and respectively guide the two cooling drafts such that they flow toward the front side. The draft-guiding grooves 95, 96 each define portions of the ventilation path according to the present teachings and also serve as a holder-branch part according to the present teachings. When the cooling draft is split (branched) and the two respective cooling drafts flow in the two first draft-guiding grooves 95, the cooling drafts blow against the outer-circumferential surface 75 of the second battery cell 722 and thereby the second battery cell 722 can be cooled. Thereafter, when the two cooling drafts respectively flow through the second draft-guiding grooves 96, the cooling drafts respectively blow against the outer-circumferential surfaces 75 of the first battery cell 721 and the third battery cell 723, thereby cooling the first battery cell 721 and the third battery cell 723. Therefore, the passageways of the cooling drafts defined between the second draft-guiding grooves 96 and the outer-circumferential surfaces 75 of the battery cells 72 each provide a representative, non-limiting example of a longitudinal-direction passageway according to the present teachings.

The following functions and effects can be achieved by the above-described battery pack 30. For example, the spaces M1, M2 are defined and the sixth partitioning rib 476 is provided in the lower case 32 such that the passageways are defined for the cooling drafts to flow through. As a result, before the cooling draft flows from the rear side to the front side of the battery cells 72, the cooling draft is divided into two cooling drafts in the left-right direction, which is the direction that the battery cells 72 are disposed in parallel. Consequently, the battery cells 72 are cooled, in order, by the first cooling, the second cooling, and the third cooling, which were described above. As a result, even in an embodiment wherein the three battery cells 72 are longitudinally disposed in parallel in the interior of the case 31, it is possible to cause the cooling draft(s) to blow against every one of the three battery cells 72. Accordingly, unevenness in the cooling of the three battery cells 72 can be reduced. That is, it is possible to make the cooling in between the three battery cells 72 even (uniform), and thereby to improve charging efficiency when all the battery cells 72 are being fully charged by the above-described dedicated charger 20, because the charging current can be increased without risking temperature-related damage to the battery cells 72.

In addition, in the above-described battery pack 30, the second battery cell 722 is cooled by the cooling draft(s) passing through the second ventilation-path volume Q2 before the first battery cell 721 and the third battery cell 723 are cooled by cooling drafts respectively passing through the first ventilation-path volume Q1 and the third ventilation-path volume Q3. Because the position (reference letter T) of the sixth partitioning rib 476 in the front-rear direction is located rearward of the middle of the case 31, the segments wherein cooling takes place by the cooling drafts respectively passing through the first ventilation-path volume Q1 and the third ventilation-path volume Q3 are longer than the segment wherein cooling takes place by cooling draft(s) passing through the second ventilation-path volume Q2. Accordingly, because the three battery cells 72 are cooled in separate segments, the cooling drafts, after they have been warmed up, can blow against the battery cells 72 over a relatively long distance, which makes it possible to increase the cooling efficiency.

In addition, in the above-described battery pack 30, the sixth partitioning rib 476, which functions in the second cooling, is disposed (provided) at a position between the rear ends and the front ends of the battery cells 72. As a result, the battery cells 72 can be cooled in separate segments, that is, the segment up until the division of the cooling draft by the spaces M1, M2 and the sixth partitioning rib 476 and the segments after the division of the cooling draft by the spaces M1, M2 and the sixth partitioning rib 476. Accordingly, it is possible to define the segments in which the battery cells 72 are cooled in conjunction with testing as to how the cooling drafts warm up, thereby making it possible to further reduce unevenness in the cooling of the three battery cells 72. In addition, in the above-described battery pack 30, the ventilation-path volumes (chambers) Q1, Q2, Q3 are formed adjacent to the inner bottom surface 321 of the lower case 32, which makes it possible to configure (define) the passageways, wherethrough the cooling drafts flow, without increasing the part count. As a result, it is possible to achieve compact designs of the battery pack 30.

In addition, in the above-described battery pack 30, because the ventilation-path volumes Q1, Q3 are provided with (defined in part by) the second partitioning ribs 462, the flow of the cooling draft(s) supplied in the interior of the case 31 can be directed toward the outer-circumferential surfaces 75 of the battery cells 72. As a result, the cooling effect of each of the three battery cells 72 can be further increased. In addition, in the above-described battery pack 30, the draft-guiding grooves 95, 96, which respectively guide two cooling drafts, are provided (defined) in the lower surface 901 of the cell holder 90, and thereby upper sides of the battery cells 72 are cooled by these cooling drafts. Consequently, the battery cells 72 can be cooled with good efficiency without increasing the part count. That is, it is possible to achieve not only the cooling of the battery cells 72 with good efficiency but also, at the same time, compact designs of the battery pack 30.

In addition, in the above-described battery pack 30, the first ventilation opening 93 and the second ventilation openings 94 are provided (defined) in the cell holder 90 such that they pass through in the up-down direction, which makes it possible to lower the ventilation (flow) resistance of the cooling drafts that flow in the interior of the case 31. As a result, even though the cell holder 90, which holds the battery cells 72, is provided in the interior of the case 31, it is possible to prevent an adverse drop in the performance of the cooling of the battery cells 72. In addition, in the above-described battery pack 30, the ventilation-path volumes (chambers) Q1, Q2, Q3 are defined, in part, by the left-right-partitioning ribs 40 and the front-rear-partitioning ribs 45 on the inner bottom surface 321 of the lower case 32, which also serve to hold the battery cells 72. As a result, in such a battery pack 30, it is possible to eliminate rattling of the battery cells 72 while also reducing unevenness in the above-described cooling. Therefore, the compactness of the battery pack 30 can be maintained while increasing the quality of the battery pack 30.

In addition, in the above-described battery pack 30, the front-rear-partitioning ribs 45 separate (isolate) the ventilation chambers (volumes) of the ventilation-path volumes Q1, Q2, Q3, which serve as portions of the ventilation path, from the lead plates 73 (731, 732, 733, 734), which constitute the electrode-end surfaces of the battery cells 72. Therefore, even if, for example, moisture, foreign matter, or the like has entered into the ventilation volumes, the lead plates 73, which constitute the electrode-end surfaces of the battery cells 72, remain isolated from such moisture, foreign matter, or the like. Because the lead plates 73, which constitute the electrode-end surfaces of the battery cells 72, are effectively protected from moisture, foreign matter, or the like, the battery cells 72 can be prevented from short circuiting.

Second Embodiment

Next, a second embodiment for implementing the battery pack according to the present teachings will be explained, with reference to FIG. 20 to FIG. 24. The battery pack 30A of the second embodiment principally differs from the battery pack 30 of the above-described first embodiment with regard to the number of battery cells 72.

Specifically, in the battery pack 30 according to the first embodiment, three of the battery cells 72 are longitudinally disposed in parallel. In contrast, in the battery pack 30A according to the second embodiment, two levels, in the up-down direction, of battery cells 72a, 72b are provided, each level comprising three of the battery cells longitudinally disposed in parallel. Therefore, the battery pack 30A according to the second embodiment contains a total of six of the battery cells 72a, 72b, in which two levels of three battery cells 72 are stacked in a direction (the up-down direction) orthogonal to the direction that the battery cells 72 are disposed in parallel. Furthermore, in the explanation of the battery pack 30A below, only those modified parts corresponding to the number of the battery cells 72a, 72b in comparison with the above-described battery pack 30 will be explained; parts of the battery pack 30A that are configured identically to those in the above-described battery pack 30 are assigned the same reference numbers in the drawings, and explanations thereof are omitted.

The lower case 32A of the battery pack 30A is formed into the shape of a box having a depth that can house the six battery cells 72a, 72b arranged in two vertical levels, each level comprising three of the battery cells longitudinally disposed in parallel. The inner bottom surface 321 of the lower case 32A is configured the same as the inner bottom surface 321 of the lower case 32 according to the first embodiment. The lower case 32A is joined with the upper case 51 to form a case 31A. The battery cells 72a, 72b, which are arranged in two vertical levels of three parallel battery cells, can be housed in the case 31A. A separate holder 90A is interposed between the two vertical levels of three battery cells 72a, 72b and provides one representative, non-limiting example of a separator according to the present teachings, because it serves as a partition between the battery cells 72 in the stacking direction (i.e. between two levels of battery cells 72).

Figure 24:
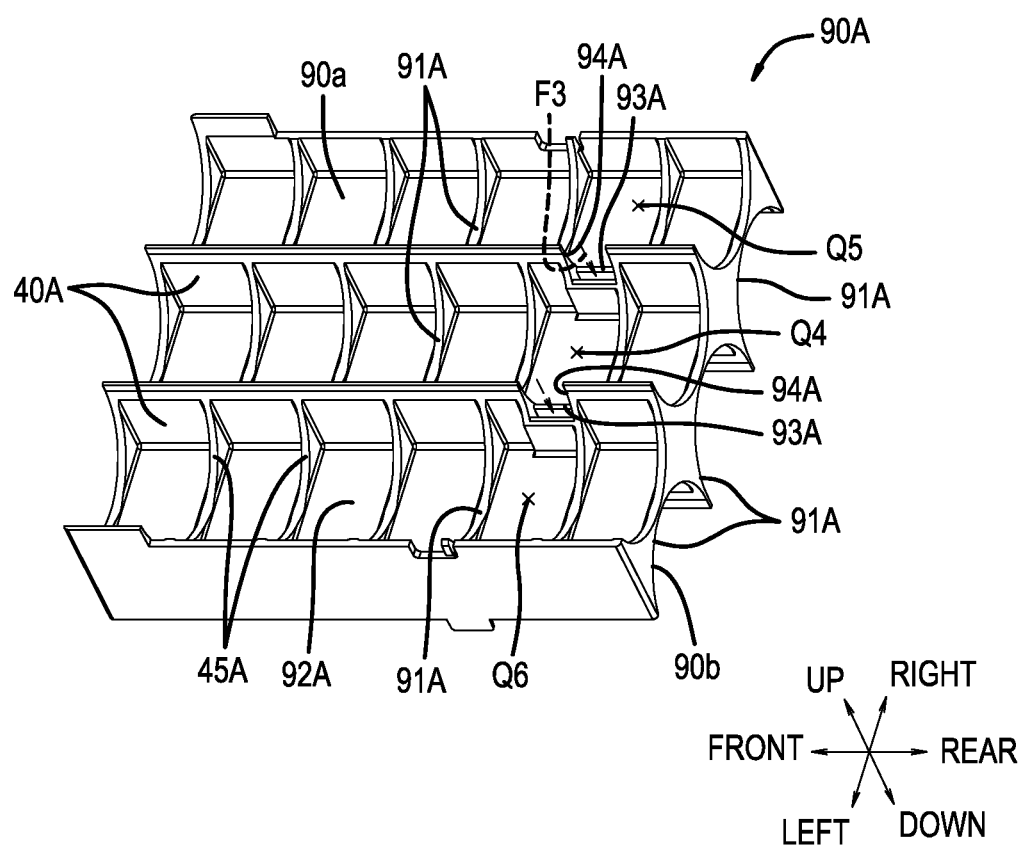
FIG. 24 is an enlarged oblique view of a separate holder.

As shown in FIG. 24, cell-housing recessed parts 91A that house and hold the three battery cells 72b in a longitudinal arrangement are provided (defined) on a lower surface 90b side of the separate holder 90A. In addition, additional cell-housing recessed parts 91A that house and hold the three battery cells 72a in a longitudinal arrangement also are provided on an upper surface 90a side of the separate holder 90A. All of the cell-housing recessed parts 91A have a shape that extends along the respective circumferential directions of the outer-circumferential surfaces 75 of the battery cells 72a, 72b and are proximate to the outer-circumferential surfaces 75 of the battery cells 72a, 72b. Furthermore, the cell-housing recessed parts 91A are provided with a partition part 92A, which separates adjacent battery cells 72a, 72b in the up-down direction. The partition part 92A is formed across the entire area wherein the battery cells 72a are longitudinally disposed in parallel. In this way, the cell-housing recessed parts 91A are disposed in between the battery cells 72a and the battery cells 72b such that the cell-housing recessed parts 91A intervene between adjacent battery cells 72a, 72b in the up-down directions.

Figure 22:
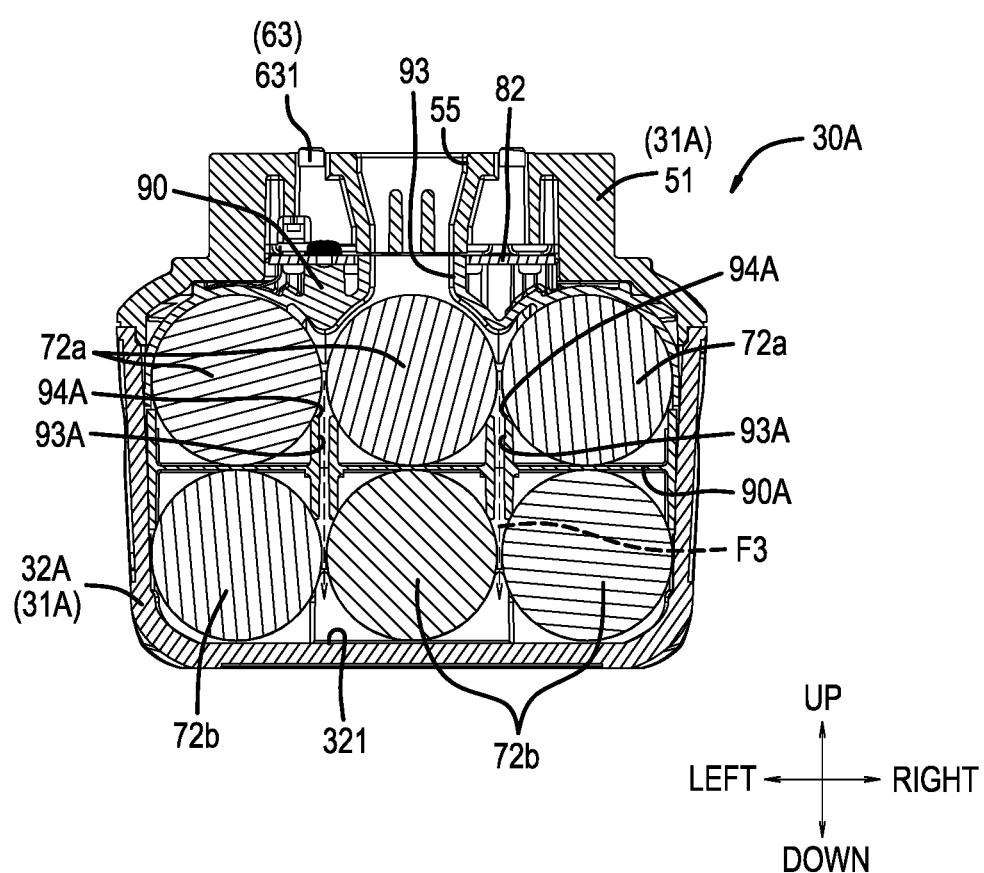
FIG. 22 is a cross-sectional view (auxiliary cross-section) that shows a cross-section taken along line (XXII)-(XXII) in FIG. 21.
Figure 23:
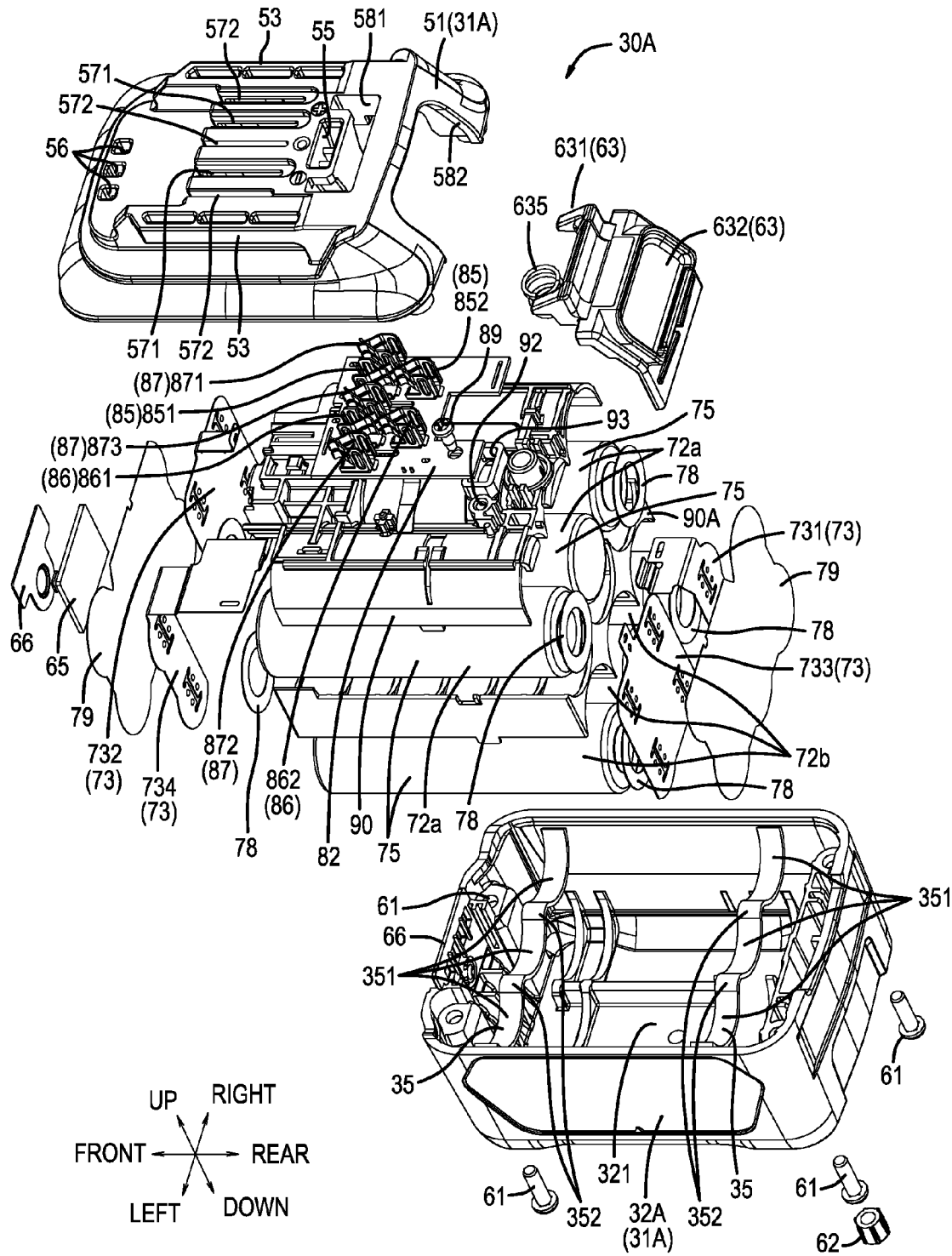
FIG. 23 is an exploded oblique view of the battery pack shown in FIG. 20.

First partitioning ribs 40A, which are formed substantially the same as the above-described left-right-partitioning ribs 40, and second partitioning ribs 45A, which are formed substantially the same as the above-described front-rear-partitioning ribs 45, are provided on the upper surface 90a and on the lower surface 90b of the separate holder 90A. The first partitioning ribs 40A and the second partitioning ribs 45A each provide representative, non-limiting examples of a cell-holding part according to the present teachings. In the separate holder 90A of the second embodiment, vertical-communication parts 93A and notched parts 94A are also provided such that the cooling draft that enters via the air-inlet port 55 into the interior of the case 31A blows against the battery cells 72a, 72b. As shown in FIG. 22, the vertical-communication parts 93A and the notched parts 94A are located such that they substantially face the first ventilation opening 93 of the cell holder 90 and are defined by the first partitioning ribs 40A, which demarcate in the left-right direction. Furthermore, the vertical-communication parts 93A each provides a representative, non-limiting example of a communication hole according to the present teachings and provide (permit) fluid (cooling air) communication in the stacking direction of the battery cells 72. It is noted that reference letter F3 (see FIG. 22) indicates cooling drafts that respectively flow through the vertical-communication parts 93A.

Specifically, the first partitioning ribs 40A, which substantially face the first ventilation opening 93, are provided with the notched parts 94A, which are configured such that their upper parts are notched (omitted). The vertical-communication parts 93A, which provide (permit) fluid communication through the separate holder 90A in the up-down direction, are provided in the first partitioning ribs 40A, wherein the notched parts 94A are provided. Thus, even though the separate holder 90A is provided and the battery cells 72a, 72b are stacked in two vertical levels of three battery cells, cooling drafts can be supplied to the battery cells 72b on the lower side. Consequently, unevenness in the cooling of the vertically-stacked battery cells 72a, 72b can be reduced, and the charging efficiency of the battery cells 72 can be improved when the battery cells 72 are being fully charged by the above-described dedicated charger 20.

Battery packs according to the present teachings are not limited to the above-described embodiments and additional embodiments may be configured by modifying the following parts as appropriate. That is, although the number of the battery cells in the above-described embodiments is three or six, the number of the battery cells is not limited to these numbers as long as there is a plurality of the battery cells. In addition, the rib shapes of the ventilation path, the divided-duct parts, and the like according to the present teachings are not limited to the shapes of the left-right-partitioning ribs 40 and the front-rear-partitioning ribs 45 in the above-described embodiments, and any appropriate shapes may be selected.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs, as well as method of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

10 Tool main body (power tool)
11 Drive part
12 Grip part
13 Battery-mounting part
14 Female rail
15 Positive terminal
16 Negative terminal
17 Communication terminal
20 Dedicated charger
21 Battery-mounting part
22 Female rail
23 Female hook
24 Communication terminal
25 Ventilation port
30 Battery pack
31 Case
32 Lower case
321 Inner-part bottom surface
33 Front-side screw hole
34 Rear-side screw hole
35 Cushioning mat
351 Contact-making circumferential-surface part
352 Inter-rib part
36 Front-side-drain hole
37 Rear-side-drain hole
38 Foreign-matter-ingress-restricting rib
39 Drain hole
40 Left-right-partitioning rib
401 First right-left-partitioning rib
402 Second left-right-partitioning rib
41 Front-mat-support part
42 Partitioning single part
421 Rear end of partitioning single part
43 Rear-mat-support part
45 Front-rear-partitioning rib
461 First partitioning rib
462 Second partitioning rib
463 Third partitioning rib
464 Fourth partitioning rib
475 Fifth partitioning rib
476 Sixth partitioning rib (branch part)
477 Seventh partitioning rib
478 Eighth partitioning rib
51 Upper case
52 Female-thread part
53 Male rail
55 Air-inlet port (first ventilation hole)
56 Exhaust port (second ventilation hole)
571 Charging/discharging slit
572 Communication slit
581 Hook opening
582 Manipulation opening
59 Display opening
61 Screw member
62 Screw cap
63 Male-hook mechanism
631 Male hook
632 Manipulation part (button)
64 LED-display apparatus
65 LED board
66 LED label
661 Pushbutton part
662 LED-transmissive part
70 Battery main body
71 Battery part
72 Battery cell
721 First battery cell
722 Second battery cell
723 Third battery cell
73 Lead plate
731 First lead plate
732 Second lead plate
733 Third lead plate
734 Fourth lead plate
75 Outer-circumferential surface
78 Insulating sheet
79 Insulating sheet
81 Circuit part
82 Terminal board
831 Insertion hole
832 Contact hole
84 Female terminal
841 Seat part
842 Frame part
843 Contact part
85 First charging/discharging terminal
86 Second charging/discharging terminal
851, 861 Front-side terminals
852, 862 Rear-side terminals
87 Communication terminal
871 First communication terminal
872 Second communication terminal
873 Third communication terminal
881 Drain slit
882 Circular-hole part
89 Screw member
90 Cell holder
90A Separate holder (separator)
91 Cell-housing recessed part
92 Female thread
93 First ventilation opening
94 Second ventilation opening
95 First draft-guiding groove (holder-branch part)
96 Second draft-guiding groove
F1, F2 Cooling drafts (ventilation path)
L1 First housing volume
L2 Second housing volume L3 Third housing volume
M1, M2 Spaces
P1 Front-mat-support area
P2 Rear-mat-support area
P3 Ingress-restricted region
Q1 First ventilation-path volume (longitudinal-direction passageway part)
Q2 Second ventilation-path volume (longitudinal-direction passageway part)
Q3 Third ventilation-path volume (longitudinal-direction passageway part)
Q4 Center-space volume
Q5 Right-side-space volume
Q6 Left-side-space volume
S Left-right centerline

The invention claimed is:

1. A battery pack that is mountable on a power tool and on a charger, comprising:
a case constituting an outer shell;
a plurality of columnar battery cells, each having a longitudinal direction, the battery cells being disposed in an interior of the case such that the battery cells are aligned and the longitudinal directions thereof are disposed in parallel;
a first ventilation hole and second ventilation holes, each of which are formed such that they permit fluid communication between the interior and an exterior of the case; and
at least one fixing wall provided on an inner bottom surface of the case and contacting outer-circumferential surfaces of the battery cells;
wherein:
a ventilation path is defined in the interior of the case such that the first ventilation hole serves as an inlet thereof and the second ventilation holes serve as outlets thereof;
a plurality of longitudinal-direction passageways, wherethrough a plurality of cooling drafts respectively flow along the longitudinal directions of the battery cells, is provided in the ventilation path, each longitudinal-direction passageway being arranged in the direction that the battery cells are disposed in parallel;
a longitudinal extension of each of the longitudinal-direction passageways extends in parallel to the longitudinal directions of the battery cells; and
the at least one fixing wall isolates at least a portion of the ventilation path from electrode-end surfaces of the battery cells.

2. The battery pack according to claim 1, wherein at least two of the longitudinal-direction passageways are defined between the battery cells and portions of the case, which face the battery cells.

3. The battery pack according to claim 1, further comprising:
a branch part provided in the interior of the case, the branch part being configured to divide a cooling draft, which has entered the ventilation path via the first ventilation hole, into at least two of the plurality of cooling drafts that respectively flow to at least two of the plurality of the longitudinal-direction passageways.

4. The battery pack according to claim 3, wherein at least a portion of the branch part also serves to hold at least one of the battery cells.

5. The battery pack according to claim 3, wherein, with respect to a longitudinal center point of the battery cells, the branch part is disposed on an upstream side of the cooling drafts that flow in the longitudinal direction.

6. The battery pack according to claim 3, wherein the branch part is also at least partially defined on the inner bottom surface of the case.

7. The battery pack according to claim 1, further comprising:
a cell holder, which holds at least some of the plurality of battery cells and is disposed in the interior of the case; and
a holder-branch part provided in the cell holder, the holder-branch part being configured to divide a cooling draft that has entered via the first ventilation hole into at least two of the plurality of cooling drafts that respectively flow to at least two of the plurality of the longitudinal-direction passageways;
wherein said at least two longitudinal-direction passageways are defined between the battery cells and portions of the cell holder that face the battery cells.

8. The battery pack according to claim 7, wherein:
the holder-branch part comprises a pair of first grooves and a pair of second grooves defined in the cell holder,
the first grooves extend in opposite directions, with respect to a first ventilation opening defined in the cell holder, along a direction orthogonal to the longitudinal directions of the battery cells, and
the second grooves respectively extend in the direction parallel to the longitudinal directions of the battery cells from respective ends of the first grooves up to the second ventilation holes, each second groove being in fluid communication with a different one of the plurality of battery cells.

9. The battery pack according to claim 1, wherein:
the battery cells, which are disposed in parallel, are stacked in at least two levels in a direction orthogonal to the direction that the battery cells are disposed in parallel;
a separator is interposed between the at least two levels of the battery cells in the stacking direction; and
at least one communication hole, which permits fluid communication in the stacking direction, is provided in the separator.

10. The battery pack according to claim 1, wherein the at least one fixing wall is disposed on a downstream side of at least two of the longitudinal-direction passageways and is configured to redirect the cooling drafts, which are flowing in said at least two longitudinal-direction passageways, perpendicularly towards the second ventilation holes.

11. The battery pack according to claim 1, wherein:
the first ventilation hole is defined on an upstream side of the cooling drafts that flow to the longitudinal-direction passageways within the case; and
the second ventilation holes are defined on a downstream side of the cooling drafts that flow in the longitudinal-direction passageways within the case.

12. The battery pack according to claim 3, wherein the ventilation path further includes two spaces respectively defined around one of the battery cells, the spaces permitting communication of a cooling draft, which has entered via the first ventilation hole, to the branch part.

13. The battery pack according to claim 1, wherein:
the plurality of battery cells comprises first, second and third battery cells,
the ventilation path comprises a first ventilation-path volume, a second ventilation-path volume and a third ventilation-path volume respectively contacting the first battery cell, the second battery cell and the third battery cell, the second battery cell is disposed between the first and third battery cells in the direction that the battery cells are disposed in parallel, the first ventilation-path volume and the third ventilation-path volume constitute two of the longitudinal-direction passageways, and the first ventilation-path volume and the third ventilation-path volume each have a volume that is greater than the volume of the second ventilation-path volume.

14. The battery pack according to claim 2, further comprising:
a branch part provided in the interior of the case, the branch part being configured to divide a cooling draft, which has entered the ventilation path via the first ventilation hole, into at least two of the plurality of cooling drafts that respectively flow to at least two of the plurality of the longitudinal-direction passageways;
wherein a first portion of the branch part also serves to hold at least one of the battery cells and a second portion of the branch part is defined on the inner bottom surface of the case; and
with respect to a longitudinal center point of the battery cells, the branch part is disposed on an upstream side of the cooling drafts that flow in the longitudinal direction.

15. The battery pack according to claim 14, further comprising:
a cell holder, which holds at least some of the plurality of battery cells and is disposed in the interior of the case; and
a holder-branch part comprising a pair of first grooves and a pair of second grooves defined in the cell holder, the first and second grooves being configured to further divide the cooling draft that has entered via the first ventilation hole into at least two of the plurality of cooling drafts that respectively flow to at least two of the plurality of the longitudinal-direction passageways;
wherein the first grooves extend in opposite directions, with respect to a first ventilation opening defined in the cell holder, along a direction orthogonal to the longitudinal directions of the battery cells, and
the second grooves respectively extend in the direction parallel to the longitudinal directions of the battery cells from respective ends of the first grooves up to the second ventilation holes, each second groove being in fluid communication with a different one of the plurality of battery cells.

16. The battery pack according to claim 15, wherein:
the at least one fixing wall is disposed on a downstream side of at least two of the longitudinal-direction passageways and is configured to redirect the cooling drafts, which are flowing in said at least two longitudinal-direction passageways, perpendicularly towards the second ventilation holes.

17. The battery pack according to claim 16, wherein the ventilation path further includes two spaces respectively defined around one of the battery cells, the spaces permitting communication of the cooling draft, which has entered via the first ventilation hole, to the branch part.

18. The battery pack according to claim 17, wherein:
the plurality of battery cells comprises first, second and third battery cells,
the ventilation path comprises a first ventilation-path volume, a second ventilation-path volume and a third ventilation-path volume respectively contacting the first battery cell, the second battery cell and the third battery cell, the second battery cell is disposed between the first and third battery cells in the direction that the battery cells are disposed in parallel, the first ventilation-path volume and the third ventilation-path volume constitute two of the longitudinal-direction passageways, and the first ventilation-path volume and the third ventilation-path volume each have a volume that is greater than the volume of the second ventilation-path volume.

19. A battery pack that is mountable on a power tool and on a charger, comprising:
a case constituting an outer shell;
a plurality of columnar battery cells, each having a longitudinal direction, the battery cells being disposed in an interior of the case such that the battery cells are aligned and the longitudinal directions thereof are disposed in parallel;
a first ventilation hole and second ventilation holes, each of which are formed such that they permit fluid communication between the interior and an exterior of the case;
a cell holder that holds at least some of the plurality of battery cells and is disposed in the interior of the case; and
a holder-branch part provided in the cell holder and comprising a pair of first grooves and a pair of second grooves defined in the cell holder;
wherein:
a ventilation path is defined in the interior of the case such that the first ventilation hole serves as an inlet thereof and the second ventilation holes serve as outlets thereof;
a plurality of longitudinal-direction passageways, wherethrough a plurality of cooling drafts respectively flow along the longitudinal directions of the battery cells, is provided in the ventilation path, each of the longitudinal-direction passageways being arranged in the direction that the battery cells are disposed in parallel;
a longitudinal extension of each of the longitudinal-direction passageways extends in parallel to the longitudinal directions of the battery cells;
the holder-branch part is configured to divide a cooling draft that has entered via the first ventilation hole into at least two of the plurality of cooling drafts that respectively flow to at least two of the plurality of the longitudinal-direction passageways;
the first grooves of the holder-branch part extend in opposite directions, with respect to a first ventilation opening defined in the cell holder, along a direction orthogonal to the longitudinal directions of the battery cells; and
the second grooves of the holder-branch part respectively extend in the direction parallel to the longitudinal directions of the battery cells from respective ends of the first grooves up to the second ventilation holes, each second groove being in fluid communication with a different one of the plurality of battery cells.

20. A battery pack that is mountable on a power tool and on a charger, comprising:
a case constituting an outer shell;
a plurality of columnar battery cells, each having a longitudinal direction, the battery cells being disposed in an interior of the case such that the battery cells are aligned, the longitudinal directions thereof are disposed in parallel, and the battery cells are stacked in at least two levels in a direction orthogonal to the direction that the battery cells are disposed in parallel;

a first ventilation hole and second ventilation holes, each of which are formed such that they permit fluid communication between the interior and an exterior of the case;

a separator interposed between the at least two levels of the battery cells in the stacking direction; and at least one communication hole defined in the separator and permitting fluid communication in the stacking direction;

wherein:

a ventilation path is defined in the interior of the case such that the first ventilation hole serves as an inlet thereof and the second ventilation holes serve as outlets thereof;

a plurality of longitudinal-direction passageways, wherethrough a plurality of cooling drafts respectively flow along the longitudinal directions of the battery cells, is provided in the ventilation path, each of the longitudinal-direction passageways being arranged in the direction that the battery cells are disposed in parallel; and a longitudinal extension of each of the longitudinal-direction passageways extends in parallel to the longitudinal directions of the battery cells.

21. A battery pack that is mountable on a power tool and on a charger, comprising:

a case constituting an outer shell;

a plurality of columnar battery cells comprising at least first, second and third battery cells, each having a longitudinal direction, the battery cells being disposed in an interior of the case such that the battery cells are aligned and the longitudinal directions thereof are disposed in parallel; and a first ventilation hole and second ventilation holes, each of which are formed such that they permit fluid communication between the interior and an exterior of the case;

wherein:

a ventilation path is defined in the interior of the case such that the first ventilation hole serves as an inlet thereof and the second ventilation holes serve as outlets thereof;

a plurality of longitudinal-direction passageways, wherethrough a plurality of cooling drafts respectively flow along the longitudinal directions of the battery cells, is provided in the ventilation path, each of the longitudinal-direction passageways being arranged in the direction that the battery cells are disposed in parallel;

a longitudinal extension of each of the longitudinal-direction passageways extends in parallel to the longitudinal directions of the battery cells;

the ventilation path comprises a first ventilation-path volume, a second ventilation-path volume and a third ventilation-path volume respectively contacting the first battery cell, the second battery cell and the third battery cell;

the second battery cell is disposed between the first and third battery cells in the direction that the battery cells are disposed in parallel;

the first ventilation-path volume and the third ventilation-path volume constitute two of the longitudinal-direction passageways; and the first ventilation-path volume and the third ventilation-path volume each have a volume that is greater than the volume of the second ventilation-path volume.

22. A battery pack that is mountable on a power tool and on a charger, comprising:

a case constituting an outer shell;

a plurality of columnar battery cells, each having a longitudinal direction, the battery cells being disposed in an interior of the case such that the battery cells are aligned and the longitudinal directions thereof are disposed in parallel;

a first ventilation hole and second ventilation holes, each of which are formed such that they permit fluid communication between the interior and an exterior of the case;

a branch part having a first portion that holds at least one of the battery cells and a second portion defined by an inner bottom surface of the case; and a cell holder that is disposed in the interior of the case and holds at least some of the plurality of battery cells;

wherein:

a ventilation path is defined in the interior of the case such that the first ventilation hole serves as an inlet thereof and the second ventilation holes serve as outlets thereof;

at least first, second, third and fourth longitudinal-direction passageways, wherethrough at least first, second, third and fourth cooling drafts respectively flow along the longitudinal directions of the battery cells, are provided in the ventilation path, each of the longitudinal-direction passageways being arranged in the direction that the battery cells are disposed in parallel;

a longitudinal extension of each of the longitudinal-direction passageways extends in parallel to the longitudinal directions of the battery cells;

the branch part is configured to divide a first portion of an air flow, which has entered the ventilation path via the first ventilation hole, into at least the first and second cooling drafts that respectively flow into the first and second longitudinal-direction passageways that are defined between some of the battery cells and portions of the inner bottom surface of the case that face the battery cells;

the cell holder has a pair of first grooves and a pair of second grooves;

the first grooves extend in opposite directions, with respect to a ventilation opening defined in the cell holder, along a direction orthogonal to the longitudinal directions of the battery cells and are configured to divide a second portion of the air flow that has entered via the first ventilation hole into at least the third and fourth cooling drafts; and the second grooves respectively define the third and fourth longitudinal-direction passageways and extend from respective ends of the first grooves up to the second ventilation holes, the second grooves respectively being in fluid communication with different ones of the plurality of battery cells.

23. The battery pack according to claim 22, wherein, with respect to a longitudinal center point of the battery cells, the branch part is disposed on an upstream side of the first and second cooling drafts that flow in the longitudinal direction.

* * * * *